US012243039B2

(12) United States Patent
Narasimhan et al.

(10) Patent No.: US 12,243,039 B2
(45) Date of Patent: *Mar. 4, 2025

(54) VIRTUAL CURRENCY SECURED PHYSICAL CURRENCY TRANSMISSION SYSTEM

(71) Applicant: PAYPAL, INC., San Jose, CA (US)

(72) Inventors: Srivathsan Narasimhan, San Jose, CA (US); Yashovardhana Samethanahalli Kote, Fremont, CA (US); Avik Chatterjee, Scottsdale, AZ (US)

(73) Assignee: PAYPAL, INC., San Jose, CA (US)

( * ) Notice: Subject to any disclaimer, the term of this patent is extended or adjusted under 35 U.S.C. 154(b) by 767 days.

This patent is subject to a terminal disclaimer.

(21) Appl. No.: 17/515,331

(22) Filed: Oct. 29, 2021

(65) Prior Publication Data

US 2022/0051218 A1    Feb. 17, 2022

Related U.S. Application Data

(63) Continuation of application No. 15/289,672, filed on Oct. 10, 2016, now Pat. No. 11,222,324.

(51) Int. Cl.
*G06Q 20/22* (2012.01)
*G06Q 20/06* (2012.01)
(Continued)

(52) U.S. Cl.
CPC ......... *G06Q 20/223* (2013.01); *G06Q 20/065* (2013.01); *H04L 9/3236* (2013.01);
(Continued)

(58) Field of Classification Search
CPC ........ G06Q 40/00; G06Q 40/02; G06Q 20/10; G06Q 20/102; G06Q 20/223; G06Q 20/065; G06Q 30/02; G06Q 30/06
(Continued)

(56) References Cited

U.S. PATENT DOCUMENTS 10,140,658 B1    11/2018  Bagherzadeh
2015/0026072 A1   1/2015  Zhou et al.
(Continued)

OTHER PUBLICATIONS

European Appl. No. 17860077.1, Search Report issued Mar. 5, 2020, 9 pages.

(Continued)

*Primary Examiner* — Hani M Kazimi
(74) *Attorney, Agent, or Firm* — Haynes and Boone, LLP

(57) ABSTRACT

Virtual currency ledger secured physical currency transmissions include receiving a physical currency transfer request from a physical currency receiver device of a physical currency receiver, and identifying a physical currency deliverer device of a physical currency deliverer. A physical currency delivery confirmation code is then associated with a recipient identified in the physical currency transfer request, and a virtual currency address controlled by the physical currency deliverer and included in a virtual currency public ledger is identified to the physical currency receiver device. A reimbursement request code is then received from the physical currency deliverer device and verified using the physical currency delivery confirmation code. In response to the verification, a multi-signature transaction that has been previously signed by the physical currency receiver is then signed to cause a virtual currency amount to be transferred via the virtual currency public ledger to the virtual currency address controlled by the physical currency deliverer.

20 Claims, 14 Drawing Sheets

(51) Int. Cl.
*H04L 9/32* (2006.01)
*H04L 9/00* (2022.01)

(52) U.S. Cl.
CPC ............ *G06Q 2220/00* (2013.01); *H04L 9/50* (2022.05); *H04L 2209/56* (2013.01)

(58) Field of Classification Search
USPC ..................................................... 705/39–42
See application file for complete search history.

(56) References Cited

U.S. PATENT DOCUMENTS

| | | | |
|---|---|---|---|
| 2015/0046337 A1 | 2/2015 | Hu et al. | |
| 2015/0262173 A1 | 9/2015 | Durbin et al. | |
| 2015/0294425 A1 | 10/2015 | Benson | |
| 2015/0302400 A1 | 10/2015 | Metral | |
| 2016/0125403 A1 | 5/2016 | Hu et al. | |
| 2016/0162882 A1 | 6/2016 | McClung, III | |
| 2016/0292680 A1 | 10/2016 | Wilson, Jr. et al. | |
| 2016/0300200 A1 | 10/2016 | Brown et al. | |
| 2017/0046693 A1 | 2/2017 | Haldenby et al. | |
| 2017/0221053 A1 | 8/2017 | Goloshchuk | |
| 2017/0344983 A1 | 11/2017 | Muftic | |
| 2018/0060860 A1 | 3/2018 | Tian et al. | |
| 2018/0158036 A1 | 6/2018 | Zhou et al. | |
| 2019/0102756 A1 | 4/2019 | Zhou et al. | |
| 2019/0325407 A1 | 10/2019 | Zhou et al. | |

OTHER PUBLICATIONS

European Application No. 17860077.1, Communication Pursuant to Article 94(3) EPC mailed on Jul. 9, 2021, 8 pages.
International Appl. No. PCT/US2017/054136, International Search Report and Written Opinion mailed Dec. 11, 2017, 8 pages.
Jost P.M., et al., "Hawala: The Hawala Alternative Remittance System and Its Role in Money Laundering", Retrieved from Internet URL: https://www.treasury.gov/resource-center/terrorist-citfinance/Documents/FinCEN-Hawala-rpt.pdf, 27 pages.
Kote Y.S., "Public Ledger Authentication System", U.S. Appl. No. 15/098,079, Filed On Apr. 13, 2016, 44 pages.
Nakamoto S., "Bitcoin: A Peer-to-Peer Electronic Cash System," Oct. 31, 2008, XP055192574, Retrieved from Internet URL: https://nakamotoinstitute.org/static/docs/bitcoin.pdf, 9 pages.
Narasimhan S., et al., "Public Ledger Authentication System", Filed on Jun. 28, 2016, U.S. Appl. No. 15/195,030, 57 pages.
Tu K.V., et al., "Rethinking Virtual Currency Regulation in the Bitcoin Age," vol. 90(1), Retrieved from Internet URL: https://dialog.proquest.com/professional/docview/1679398868accountid=131444, Mar. 2015, 54 pages.

VIRTUAL CURRENCY SECURED PHYSICAL CURRENCY TRANSMISSION SYSTEM

CROSS REFERENCE TO RELATED APPLICATIONS

The present application is a continuation of U.S. patent application Ser. No. 15/289,672 filed Oct. 10, 2016, the contents of which are hereby incorporated by reference in their entirety for all purposes.

BACKGROUND

Field of the Disclosure

The present disclosure generally relates to physical currency transmission, and more particularly to a physical currency transmission system that is secured using a virtual currency.

Related Art

While innovations in electronic money transfer technology have made the transfer of money between parties quicker and easier, such electronic money transaction technology is not yet universally available. As such, many people still rely on the transfer of physical currency (e.g., cash). For example, laborers in many parts of the world earn physical currency from their employers, and may wish to send that physical currency to relatives in a different location. In such situations, those laborers must use trust-based systems in which they provide an amount of the physical currency to a first money transfer agent in a first location that has agreements with second money transfer agent(s) in a second location, and then trust the first money transfer agent and the second money transfer agent to cause the amount of the physical currency to be delivered to their relatives in the second location. As such, conventional physical currency transmission systems are unsecured and suffer from the need to trust money transfer agents, with little or no recourse if a desired amount of physical currency trusted to money transfer agents is not delivered to an intended recipient.

Thus, there is a need for a secured physical currency transmission system.

Figure 1:
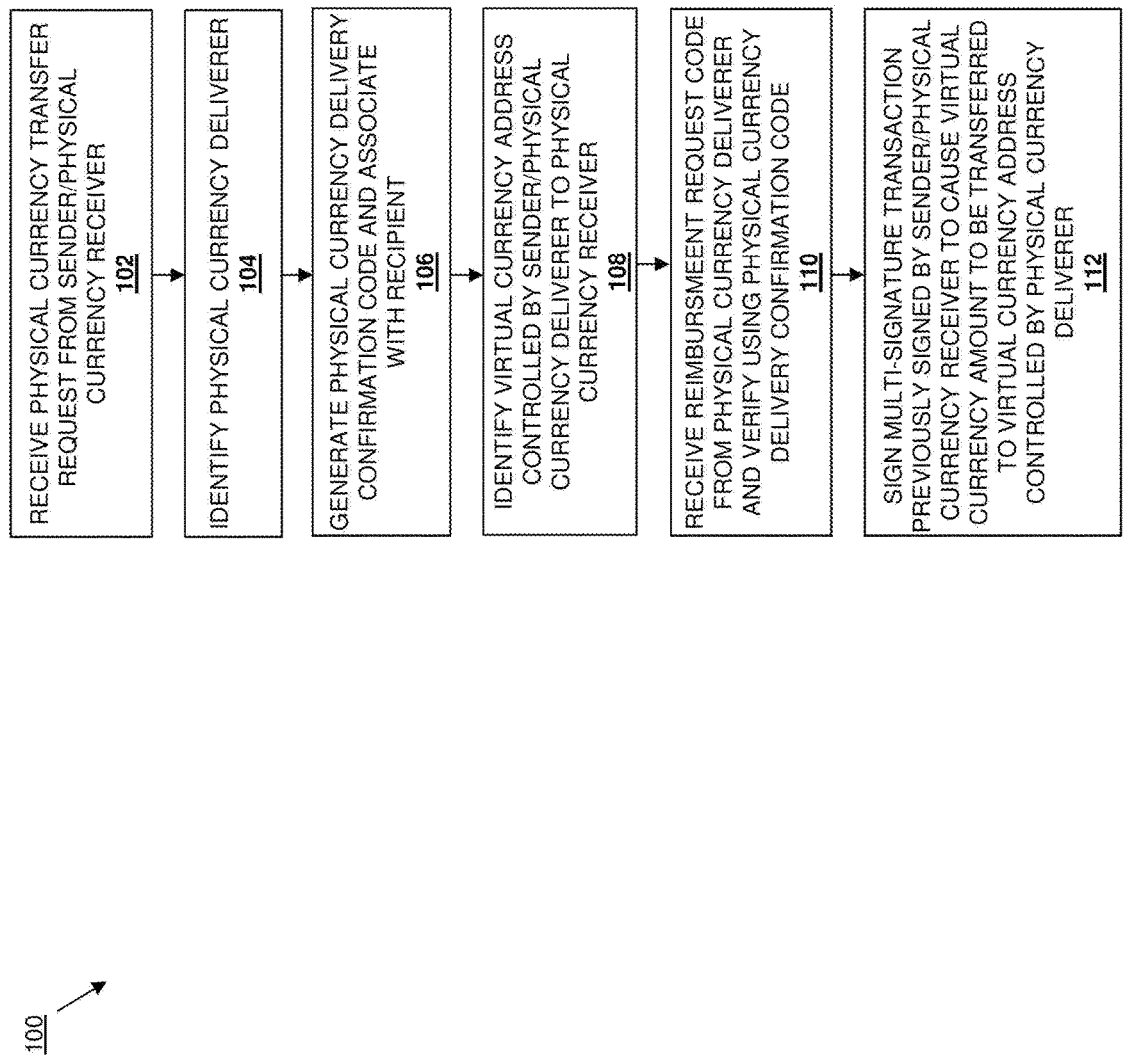
FIG. 1 is a flow chart illustrating an embodiment of a method for transmitting physical currency.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Embodiments of the present disclosure include systems and methods for securing physical currency transmission using a virtual currency. As discussed above, conventional physical currency transmission systems are unsecured and suffer from the need to trust money transfer agents, with little or no recourse if a desired amount of physical currency trusted to money transfer agents is not delivered to an intended recipient. Embodiments of the systems and methods of the present disclosure reduce the need for trust in physical currency transmission by, for example, using a virtual currency public ledger to verify the identity of physical currency transfer agents, as well as using a multi-signature transaction that is configured to transfer virtual currency on the virtual currency public ledger to reimburse a physical currency transfer agent who delivers physical currency to a recipient when that physical currency is confirmed as having been delivered.

As discussed below, a physical currency transfer request that identifies a physical currency amount and physical currency recipient information may be received from a physical currency receiver, and a physical currency deliverer may then be identified. In some examples, either or both of the physical currency recipient and the physical currency deliverer may then be verified/authenticated using a virtual currency public ledger. A physical currency delivery confirmation code may then be associated with a recipient identified in the physical currency recipient information, and a virtual currency address that is controlled by the physical currency deliverer and that is included in the virtual currency public ledger may be identified as well. When a reimbursement request code is received from the physical currency deliverer, it may be verified using the physical currency delivery confirmation code and, in response to the verification, a multi-signature transaction that has been previously signed by the physical currency receiver is signed to cause a virtual currency amount to be transferred via the virtual currency public ledger to the virtual currency address that is controlled by the physical currency deliverer. As such, physical currency receivers and physical currency deliverers may be verified using a virtual currency public ledger, and reimbursements for physical currency delivered to a recipient by the physical currency deliverer may be made via a multi-signature transaction that transfers virtual currency to the physical currency deliverer only when a physical currency delivery confirmation code is provided to the physical currency deliverer by the recipient, thus securing the physical currency transmission using the virtual currency.

Figure 2:
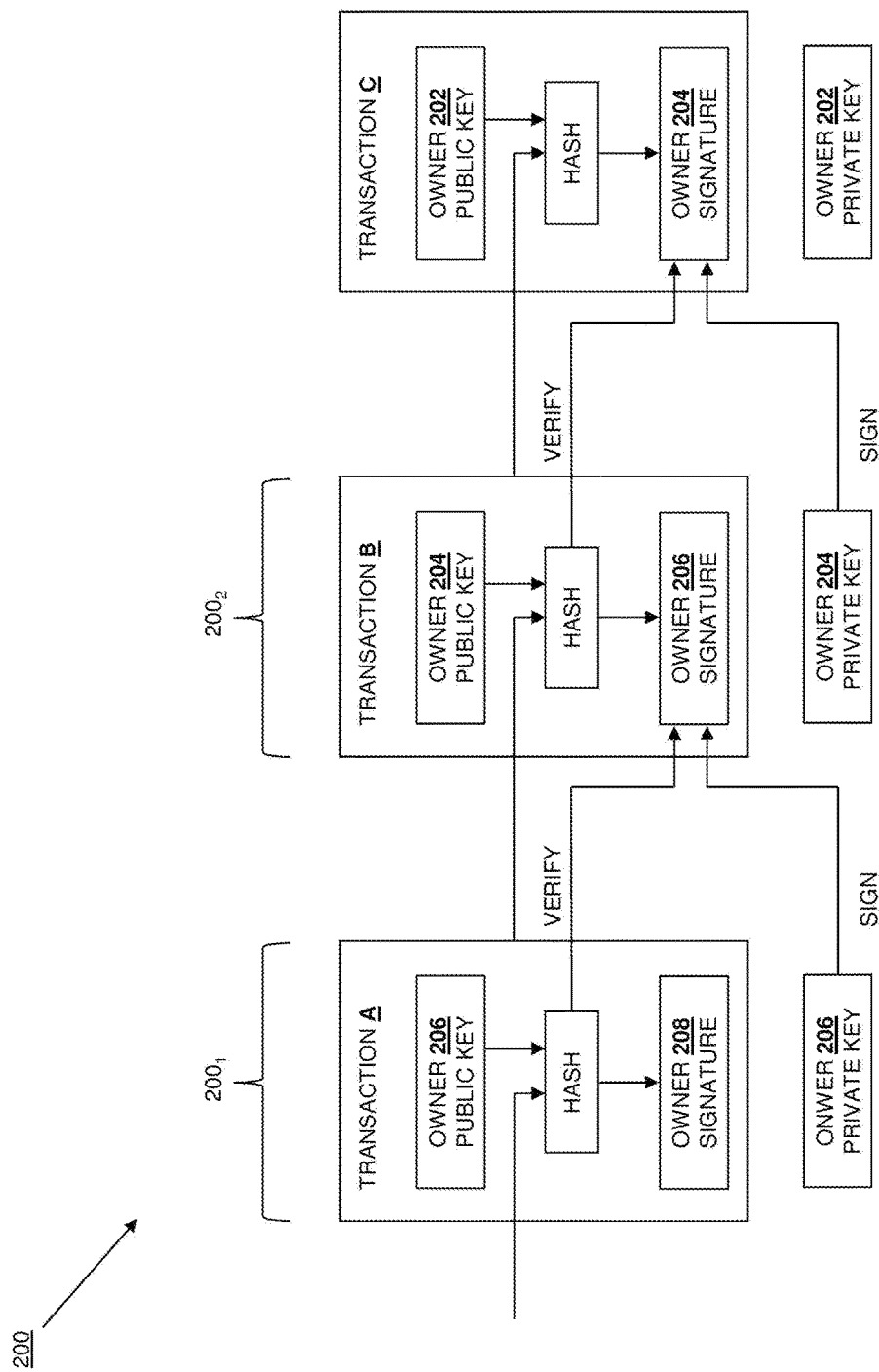
FIG. 2 is a schematic view illustrating an embodiment of an electronic coin.
Figure 3:
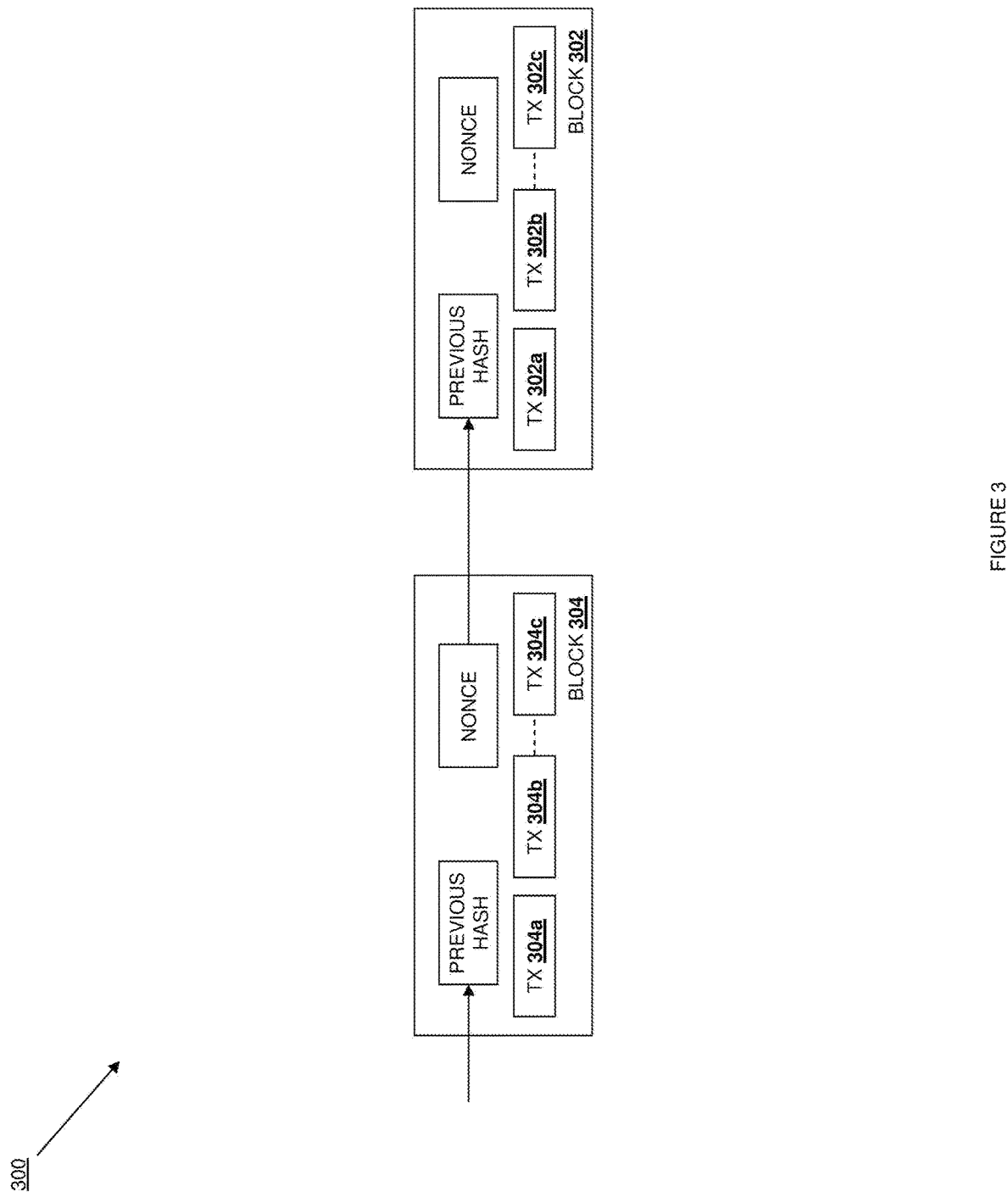
FIG. 3 is a schematic view illustrating an embodiment of a virtual currency public ledger.

Referring now to FIGS. 1, 2, and 3, a method 100 for transmitting physical currency is illustrated. In some embodiments of the method 100 described below, one or more system provider devices may operate to perform or enable the method 100. For example, a system provider may utilize system provider device(s) to enable the transfer of physical currency between a sender and a recipient using either or both of a physical currency receiver and a physical currency deliverer. In a specific example, a payment service provider such as, for example, PayPal, Inc. of San Jose, CA, may act as the system provider and utilize a payment service provider device as the system provider device discussed below to perform the method 100, and in some embodiments may operate in cooperation with one or more other system providers (via their system provider devices) and/or users (via their user devices) to perform the method 100. However, these embodiments are meant to be merely exemplary, and one of skill in the art in possession of the present disclosure will recognize that a wide variety of system providers and users may operate, alone or together, to provide the systems and methods discussed herein without departing from the scope of the present disclosure.

Referring now to FIG. 2, an embodiment of an electronic coin 200 that may provide the transfers of the virtual currency discussed below is illustrated and described briefly for reference in the discussion below. In those embodiments, a virtual currency system associated with the present disclosure may define an electronic coin as a chain of digital signatures provided by previous owners of the electronic coin to subsequent owners of the electronic coin. In the illustrated embodiment, the electronic coin 200 is owned by an owner 202, and FIG. 2 illustrates how the electronic coin 200 is defined by the digital signatures of the previous owners 204, 206, and 208. Specifically, in transaction A, a hash of the public key of owner 206 (i.e., the owner receiving, as a result of transaction A, an electronic coin $200_1$ defined by digital signatures provided up to transaction A) and the previous transaction (not illustrated, but occurring prior to transaction A) was signed by owner 208 (i.e., the owner providing, as a result of transaction A, the electronic coin $200_1$ defined by digital signatures provided up to transaction A) using a private key and added to an initial electronic coin (which was defined by digital signatures provided up to the transaction prior to transaction A) such that the electronic coin $200_1$ was transferred to owner 206.

Similarly, in transaction B, a hash of the public key of owner 204 (i.e., the owner receiving, as a result of transaction B, an electronic coin $200_2$ defined by digital signatures provided up to transaction B) and transaction A was signed by owner 206 using a private key and added to the electronic coin $200_1$ such that the electronic coin $200_2$ was transferred to owner 204. Similarly, in transaction C, a hash of the public key of owner 202 (i.e., the owner receiving, as a result of transaction C, the electronic coin 200 defined by digital signatures provided up to transaction C) and the transaction B was signed by owner 204 using a private key and added to the electronic coin $200_2$ such that the electronic coin 200 was transferred to owner 202. As is understood in the art, any user receiving an electronic coin (e.g., owner 206 in transaction A, owner 204 in transaction B, and owner 202 in transaction C) can verify the signatures to verify the chain of ownership of the electronic coin. In the discussion below, it should be understood that the term "electronic coin(s)" may be used to encompass any amount or type of electronic coins.

Referring now to FIG. 3, an embodiment of a virtual currency public ledger 300 is illustrated and described briefly for reference in the discussion below. As discussed above, the virtual currency public ledger 300 operates to verify that users transferring an electronic coin (e.g., referring back to FIG. 2, owner 206 in transaction A, owner 204 in transaction B, and owner 202 in transaction C) did not "double-spend" (e.g., use a private key to sign any previous transactions involving) that electronic coin. To produce the virtual currency public ledger 300, a distributed network of devices operate to agree on a single history of transactions in the order in which they were received such that it may be determined that a transaction between users using an electronic coin is the first transaction associated with that electronic coin. Each device in the distributed network operates to collect new transactions into a block, and then to increment a proof-of work system that includes determining a value that when hashed with the block provides a required number of zero bits.

For example, for a block 302 that includes a plurality of transactions 302a, 302b, and up to 302c, a device in the distributed network may increment a nonce in the block 302 until a value is found that gives a hash of the block 302 the required number of zero bits. The device may then "chain" the block 302 to the previous block 304 (which may have been "chained" to a previous block, not illustrated, in the same manner). When devices in the distributed network find the proof-of-work for a block, that block (e.g., block 302) is broadcast to the distributed network, and other devices in the distributed network will accept that block if all the transactions in it are valid and not already spent (which may be determined by creating the next block using the hash of the accepted block 302). The distributed network will always consider the longest chain of blocks to be the correct one, and will operate to continue to extend it. If a device receives two different versions of a block, it will work on the first block received, but save the second block received in case the branch of the chain that includes the second block becomes longer (at which point that device with switch to working on the branch of the chain that includes the second block). The electronic coin(s) 200 and virtual currency public ledger 300 discussed above provide a distributed virtual currency system in which users may participate in transactions with each other without the need for a centralized authority such as a bank. Each of those transactions is recorded in the virtual currency public ledger 300 to ensure that the electronic coins may only be spent by a user once.

Figure 4:
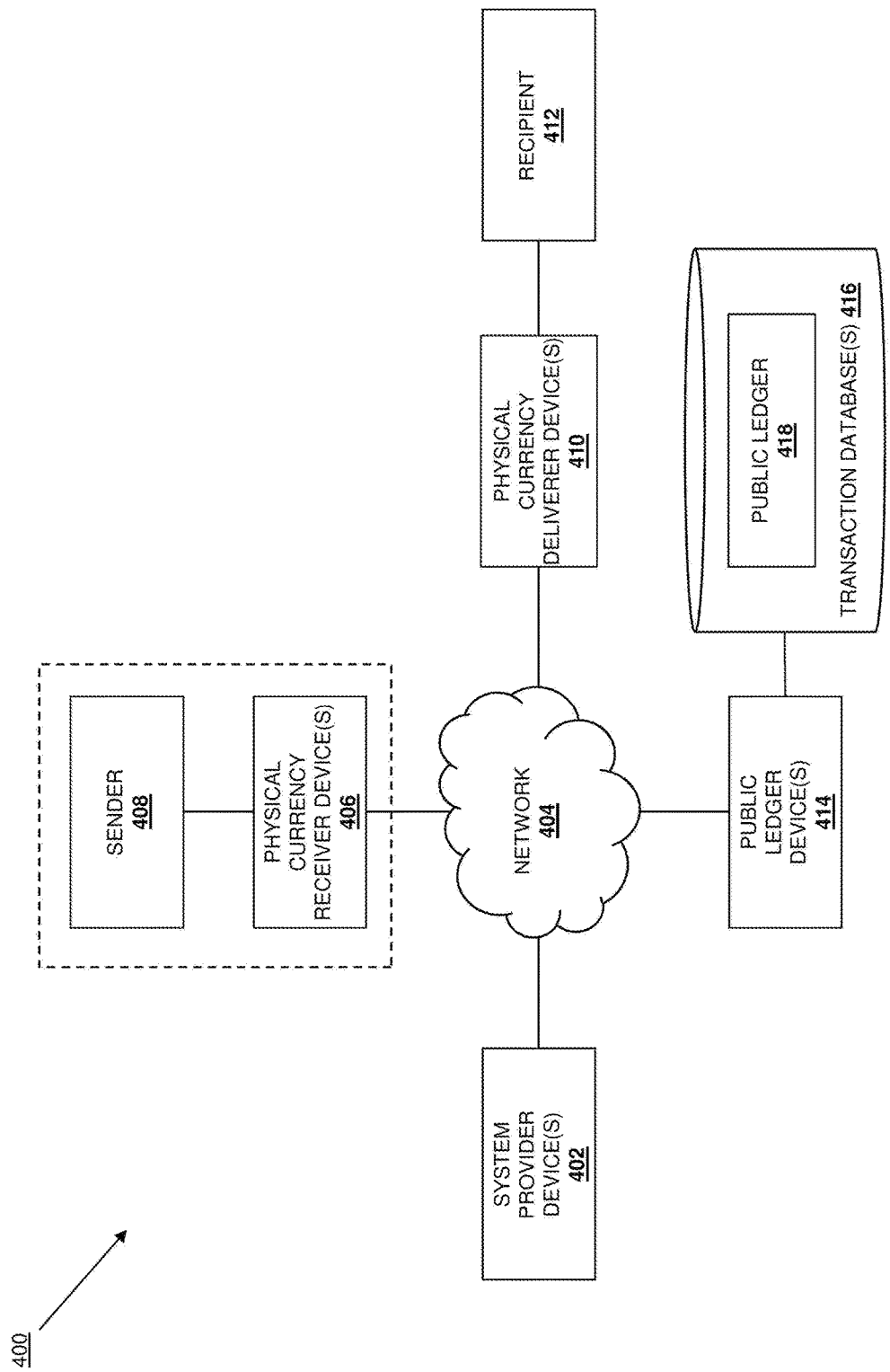
FIG. 4 is a schematic view illustrating an embodiment of an physical currency transmission system.

Referring now to FIG. 4, an embodiment of a physical currency transmission system 400 is illustrated and described briefly for reference in the method 100 discussed below. The physical currency transmission system 400 includes one or more system provider device(s) 402 that are coupled to a network 404. In the illustrated embodiment, one or more physical currency receiver device(s) 406 are coupled to the network 404 and, as discussed below, may be associated with respective physical currency receivers that may receive physical currency from a sender 408. However, as also discussed below, in some embodiments the physical currency receiver device 406 may be replaced by a sender device that is controlled by the sender 408. In the illustrated embodiment, one or more physical currency deliverer device(s) 410 are coupled to the network 404 and, as discussed below, may be associated with respective physical currency deliverer that may deliver physical currency to a recipient 412. In the illustrated embodiment, the physical currency transmission system 400 also includes public ledger device(s) 414 that are coupled to a transactional database 416 and the network 404. As discussed above, the public ledger device(s) 414 may operate to receive virtual currency transactions broadcast by any of the devices, confirm those transactions, and generate a public ledger 418 as discussed above with reference to FIG. 3.

Figure 5:
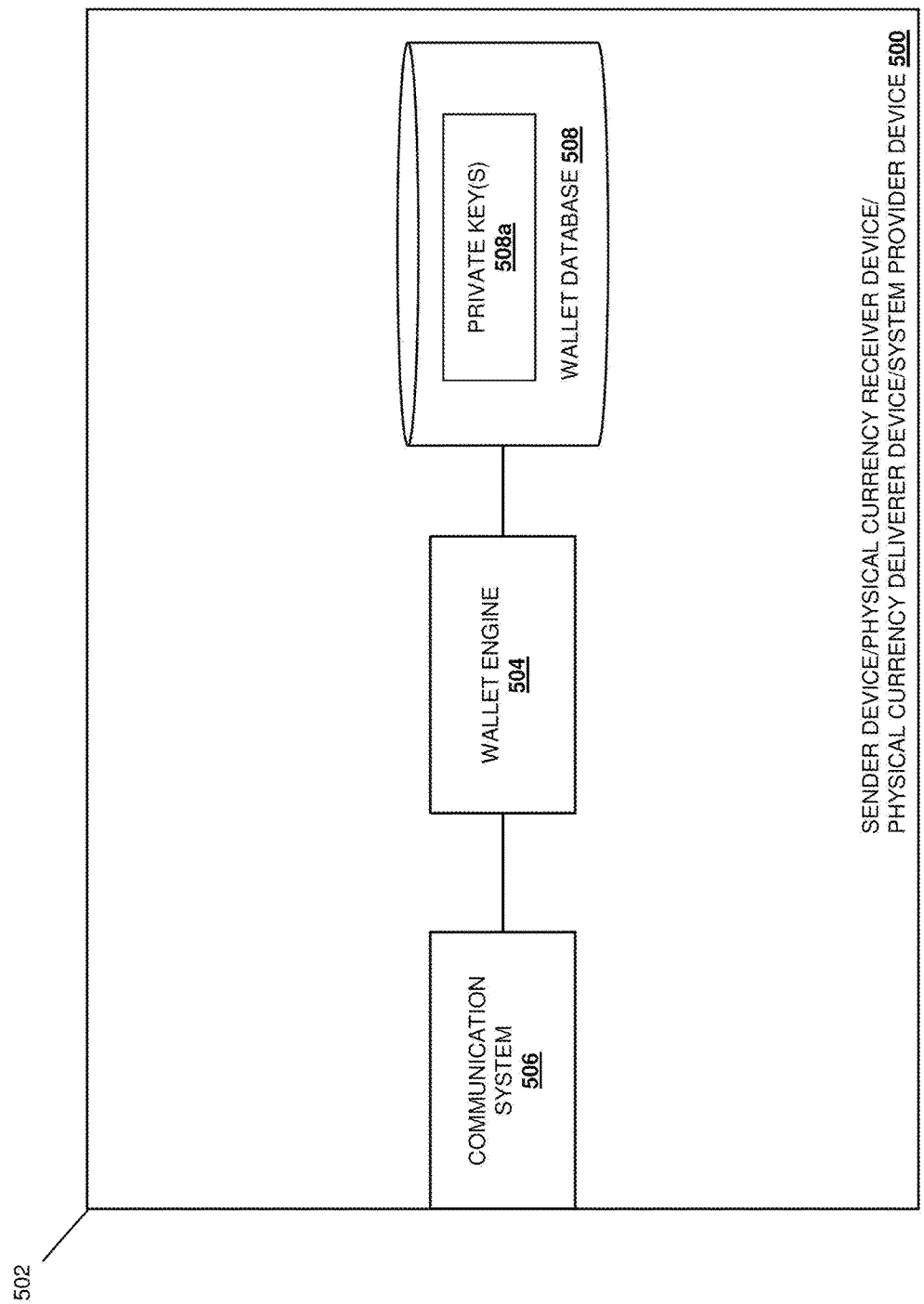
FIG. 5 is a schematic view illustrating an embodiment of a sender device, physical currency receiver device, physical currency deliverer device, or system provider device used in the physical currency transmission system of FIG. 4.

Referring now to FIG. 5, an embodiment of a device 500 is illustrated that in different embodiments may be sender device, the physical currency receiver device, the physical currency deliverer device, and/or the system provider device discussed herein. As such, in some examples (e.g., those where the device 500 is controlled the system provider device(s) 402), the device 500 may be provided by one or more server devices, while in other examples (e.g., those where the device 500 is controlled by the sender, the physical currency receiver, or the physical currency deliverer), the device 500 may be provided by a desktop computing system, a laptop/notebook computing system, a tablet computing system, a mobile phone, and/or other user devices known in the art. However, one of skill in the art in possession of the present disclosure will recognize that the device 500 may be provided by any of a variety of computing device in the different examples discussed below.

In the illustrated embodiment, the device 500 includes a chassis 502 that houses the components of the device 500, only some of which are illustrated in FIG. 5. For example, the chassis 502 may house a processing system (not illustrated) and a non-transitory memory system (not illustrated) that includes instructions that, when executed by the processing system, cause the processing system to provide a wallet engine 504 that is configured to perform the virtual currency transaction and transfer functionality discussed below. The chassis 502 may also house a communication system 506 that is coupled to the wallet engine 504 (e.g., via a coupling between the communication system 506 and the processing system) and configured to provide for communication through the network 404 as detailed below. In the illustrated embodiment, device 500 also includes a storage device with a wallet database 508 having private key(s) 508a that are configured to provide the virtual currency transfers discussed below. While the device is illustrated as including a chassis 502 that houses the wallet database 508, one of skill in the art in possession of the present disclosure will recognize that the wallet database may be provided in a different device/chassis than the device 500 such as, for example, a network attached storage device, a non-network attached computing device (e.g., a "cold storage" device), and/or any other device or storage system known in the art.

Figure 6:
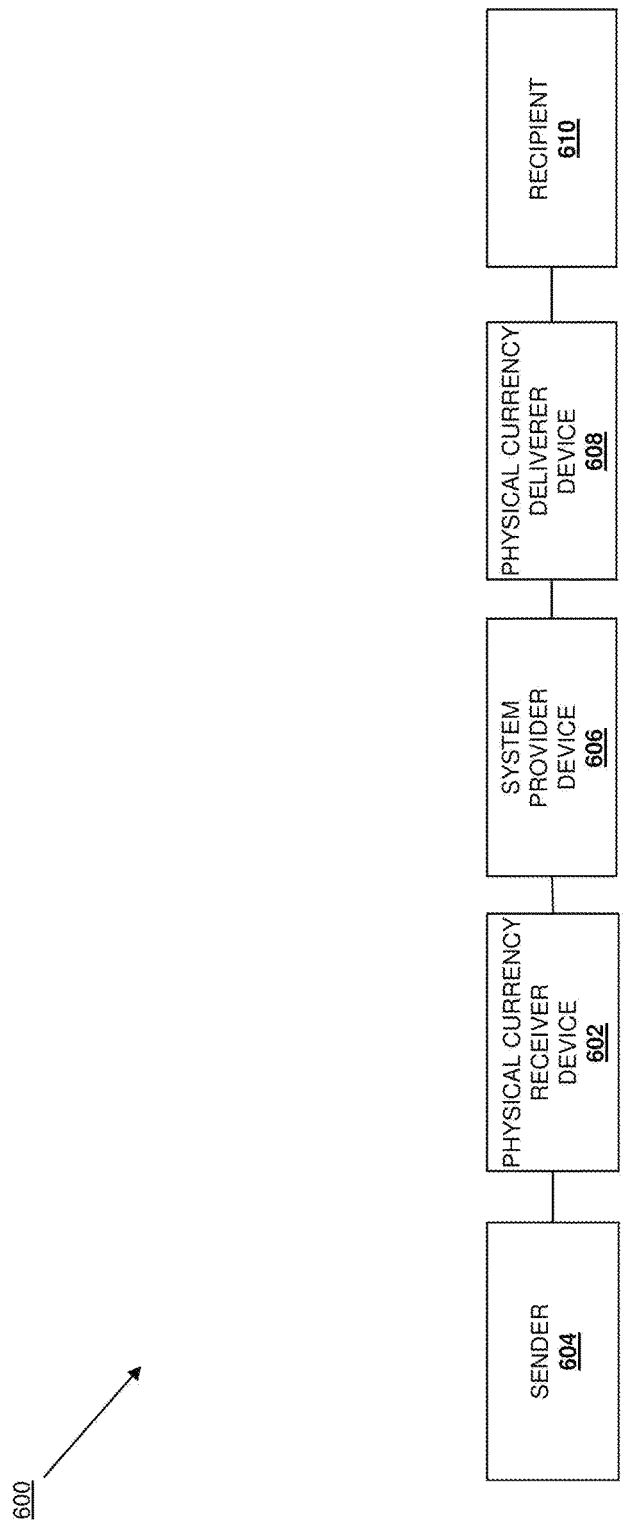
FIG. 6 is a schematic view illustrating an embodiment of the physical currency transmission system of FIG. 4.
Figure 7:
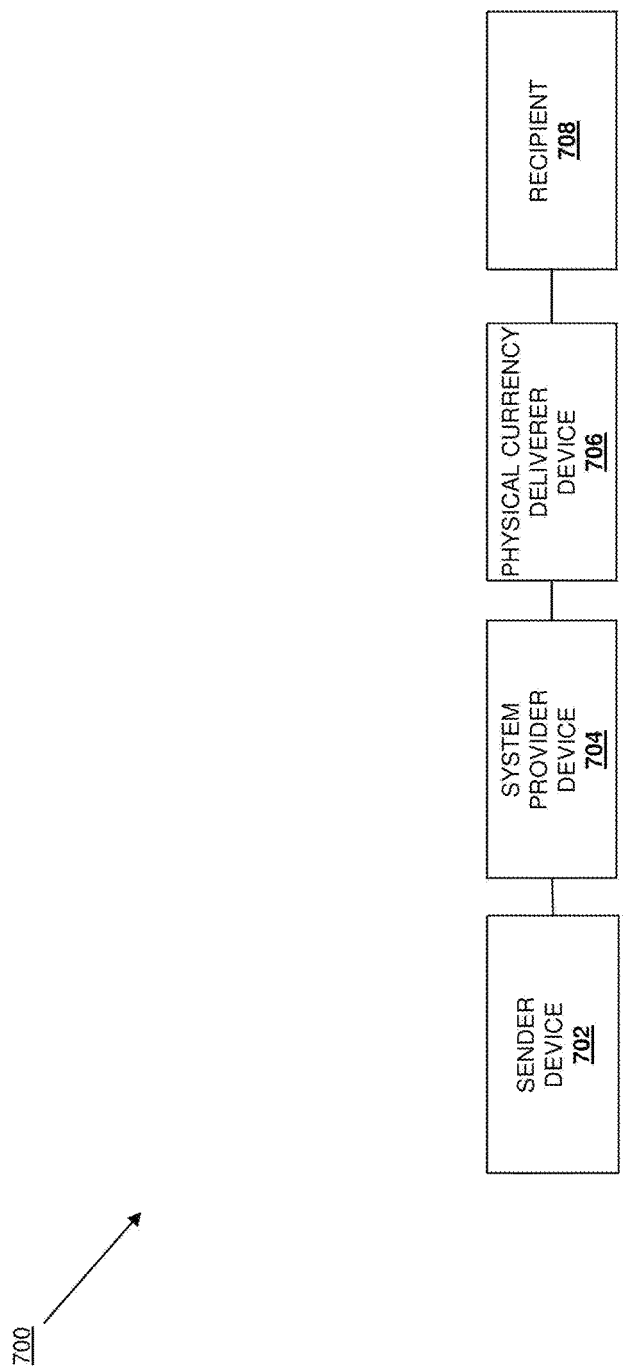
FIG. 7 is a schematic view illustrating an embodiment of the physical currency transmission system of FIG. 4.

Referring now to FIGS. 6 and 7, embodiments of physical currency transmission systems 600 and 700, respectively, are illustrated. The physical currency transmission systems 600 and 700 illustrate different embodiments of the physical currency transmission system of the present disclosure that depend on the access of a sender of physical currency to a sender device that may communicate with the system provider device(s) as discussed below. Furthermore, as discussed below, each of the embodiments of the physical currency transmission systems 600 and 700 may include multiple different embodiments in which any of the sender, the physical currency receiver, and/or the physical currency deliverer has a verified account with the system provider. As such, in some examples the sender or physical currency receiver has an account with the system provider and the physical currency deliverer does not have an account with the system provider, in some examples the sender or physical currency receiver do not have an account with the system provider and the physical currency deliverer has an account with the system provider, in some examples both of the sender or physical currency receiver and the physical currency deliverer have an account with the system provider, and in some examples neither of the sender or physical currency receiver and the physical currency deliverer has an account with the system provider.

FIG. 6 illustrates the embodiment of the physical currency transmission system 600 that includes a physical currency receiver device 602 of a physical currency receiver that may receive physical currency from a sender during the method 100. The physical currency receiver device 602 is configured to communicate with a system provider device 606, and the system provider device 606 is configured to communicate with a physical currency deliverer device 608 of a physical currency deliverer that may deliver physical currency to a recipient 610. As discussed below, the embodiment of the physical currency transmission system 600 may be utilized when the sender 604 does not have access to a device that would enable them to communicate with the system provider (via the system provider device 606), and instead utilizes the physical currency receiver (who has access to a physical currency receiver device 602 that enables them to communicate with the system provider) to transmit physical currency to the recipient 610.

FIG. 7 illustrates the embodiment of the physical currency transmission system 700 that includes a sender device 702 of a sender that is configured to communicate with a system provider device 704, and the system provider device 704 is configured to communicate with a physical currency deliverer device 706 of a physical currency deliverer that may deliver physical currency to a recipient 708. As discussed below, the embodiment of the physical currency transmission system 700 may be utilized when a sender has access to the sender device 702 that enables them to communicate with the system provider (via the system provider device 606) to transmit physical currency to the recipient 610. While a few examples have been provided, one of skill in the art in possession of the present disclosure will recognize that other modifications to the physical currency transmission system will fall within the scope of the present disclosure as well.

Referring back to FIG. 1, the method 100 begins at block 102 where a physical currency transfer request is received from a sender or physical currency receiver. In an embodiment, the system provider device(s) 402 receives a physical currency transfer request through the network 404 from one of the physical currency receiver device(s) 406. As discussed above, in the embodiment of the physical currency transmission system 600, the physical currency receiver device 602 may be controlled by a physical currency receiver that is separate from the sender 604, while in the embodiment of the physical currency transmission system 700, the sender device 702 is controlled by a sender.

As such, in an example of the physical currency transmission system 600, at block 102 the sender may provide an amount of a first physical currency (e.g., $500 United States dollars) to the physical currency receiver, and identify to the physical currency receiver a currency type for the delivered physical currency, the recipient 610, a recipient location, and/or any other information that could be utilized during the method 100 discussed below. In response, the physical currency receiver may use the physical currency receiver device 602 to send the physical currency transfer request to the system provider device 606 that includes the amount of the first physical currency, the currency type for the delivered physical currency, the identity of the recipient 610, the recipient location, and/or any other information that could be utilized during the method 100. In an example of the physical currency transmission system 700, at block 102 the sender may use the sender device 702 to send the physical currency transfer request to the system provider device 704 that includes an amount of a first physical currency, a currency type for the delivered physical currency, the identity the recipient 708, a recipient location, and/or any other information that could be utilized during the method 100 discussed below.

Figure 8:
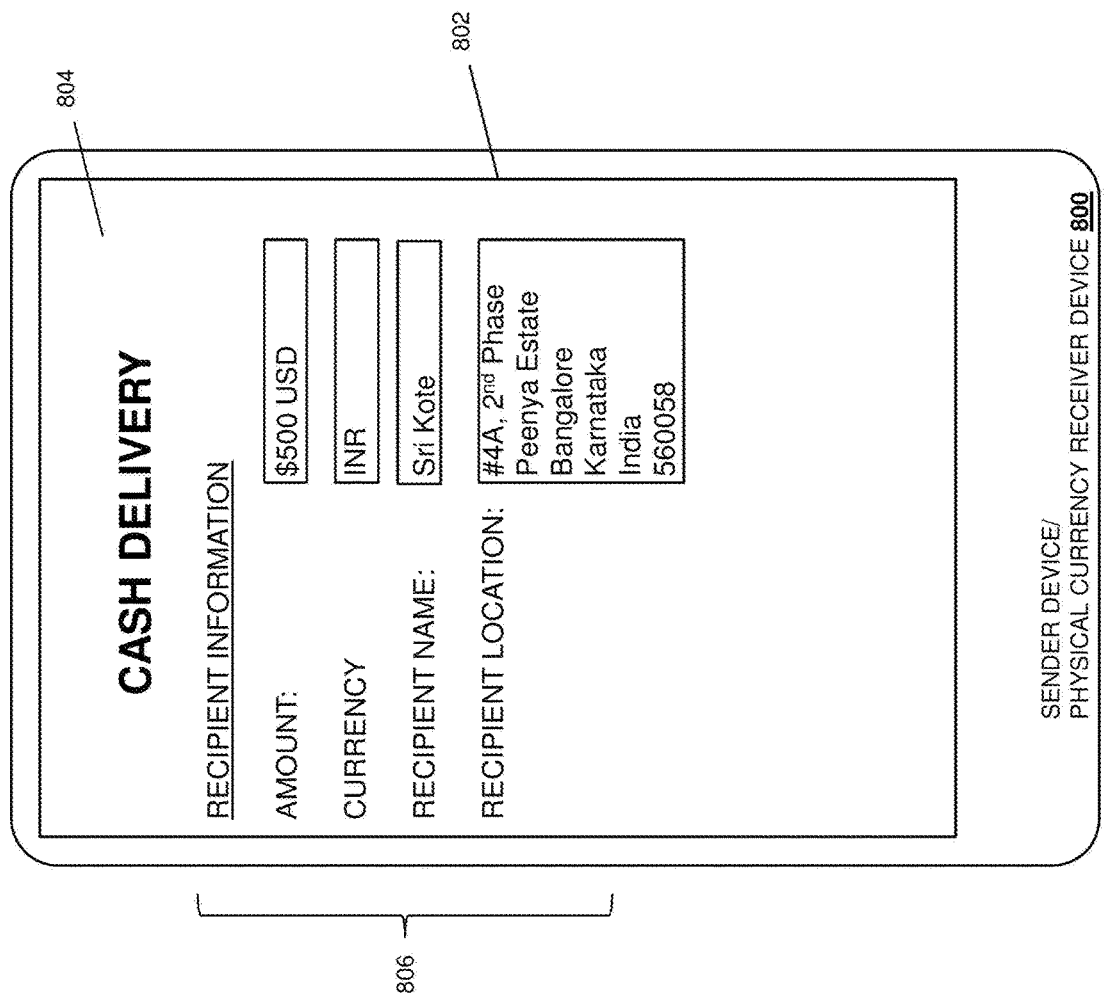
FIG. 8 is a screen shot illustrating an embodiment of a physical currency transfer request screen that may be provided on a sender device or physical currency receiver device.

Referring now to FIG. 8, an embodiment of a device 800 that may be the physical currency receiver device or the sender device discussed above is illustrated. The device 800 includes a display screen 802 displaying an embodiment of a physical currency transfer request screen 804 that may be provided to the user of the device 800 in order to allow that user to provide the physical currency transfer request to the system provider at block 102. In the illustrated example, the physical currency transfer request screen 804 includes a recipient information section 806 that allows a user to provide a physical currency amount/type, a delivered physical currency type, a recipient name, and a recipient location. In embodiments in which the device 800 is a physical currency receiver device controlled by a physical currency receiver, the information provided in the recipient information section 806 by the physical currency receiver may be received by the physical currency receiver from the sender. For example, the sender may provide an amount of physical currency, and may identify the delivered physical currency type, the recipient, and the recipient location, to the physical currency receiver. The physical currency receiver may then provide that information using the physical currency transfer request screen 804 and send the physical currency transfer request to the system provider at block 102. In embodiments in which the device 800 is a sender device controlled by the sender, the information may be provided in the recipient information section 806 by the sender.

Figure 9:
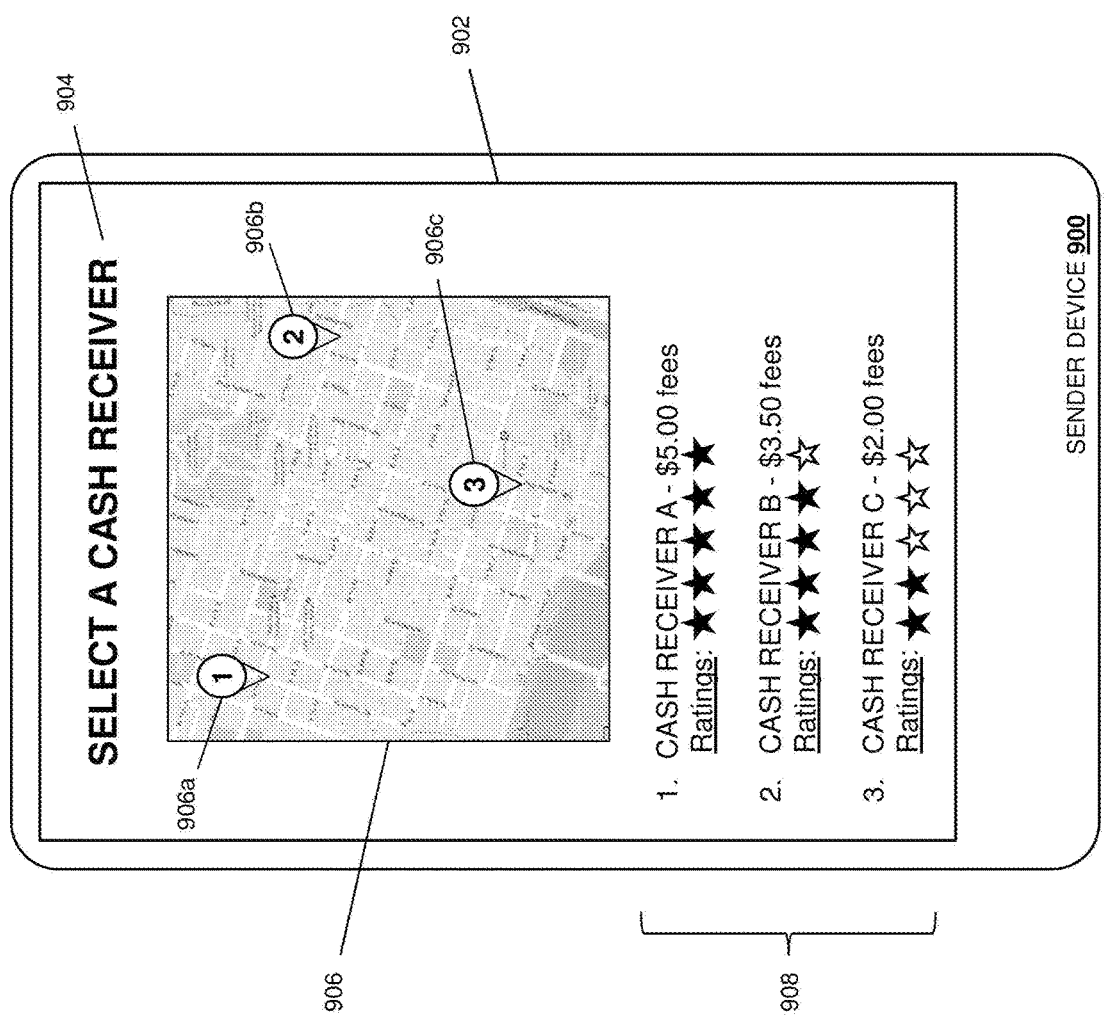
FIG. 9 is a screen shot illustrating an embodiment of a physical currency receiver selection screen that may be provided on a sender device.

In some embodiments, the sender may select a physical currency receiver for performing the method 100. Referring now to FIG. 9, an embodiment of a sender device 900 is illustrated. The sender device 900 includes a display screen 902 displaying an embodiment of a physical currency receiver selection screen 904 that may be provided to a sender to select a physical currency receiver. In the illustrated example, the physical currency receiver selection screen 904 includes a map 906 that provides map details about a location of the sender, along with identifiers 906a, 906b, and 906b for physical currency receivers available at the location of the sender, and a physical currency receiver section 908 that includes details about each of the physical currency receivers associated with the respective identifiers 906a-c on the map 906.

In one example, a sender wishing to send physical currency to a recipient may use the physical currency transfer request screen 804 to identify the amount of physical currency, the delivered physical currency type, the recipient, and the recipient location to the system provider device 402 in a physical transfer request. The system provider device 402 may then publish some or all of the details of the physical transfer request (e.g., at least the amount of the physical currency and the location) in a physical currency receiver solicitation to a network of the physical currency receiver devices 406. In response to the physical currency receiver solicitation, physical currency receivers may use their respective physical currency receiver devices to "bid" on receiving the physical currency from the sender by, for example, identifying a fee associated with receiving the physical currency from the sender.

In response to receiving those bids, the system provider device 402 may provide the physical currency receiver selection screen 904 over the network for display on the sender device 900 that includes physical currency receivers, their associated fees, and in the illustrated embodiment, ratings that were previously collected by the system provider and that are based on other senders that used those physical currency receivers previously. As such, in embodiments of block 102 where the sender has a sender device for sending physical currency transfer requests to the system provider, the sender may use the physical currency receiver selection screen 904 to select a physical currency receiver for performing the method 100. However, in other embodiments, the system provider may provide the physical currency receiver options from a database of physical currency receivers (e.g., rather than a bid process), and/or operate to select the physical currency receiver for performing the method 100 (e.g., without input from the sender) based on, for example, the fees charged by that physical currency receiver, the ratings for that physical currency receiver, and/or any other information that would be apparent to one of skill in the art in possession of the present disclosure.

The method 100 then proceeds to block 104 where a physical currency deliverer is identified. In an embodiment, at block 104 the system provider device 402 identifies a physical currency deliverer. For example, in response to receiving the physical currency transfer request that identifies the amount of physical currency, the delivered physical currency type, the recipient, and the recipient location, the system provider device 402 may then publish some or all of the details of the physical transfer request (e.g., at least the amount of the physical currency and the location) in a physical currency deliverer solicitation to a network of the physical currency deliverer devices 410. In response to the physical currency deliverer solicitation, physical currency deliverers may use their respective physical currency deliverer devices to "bid" on delivering the physical currency to the recipient (or recipient location) by, for example, providing a fee associated with receiving the physical currency from the sender. The system provider may then select one of those physical currency deliverers for delivering the physical currency to the recipient.

Figure 10:
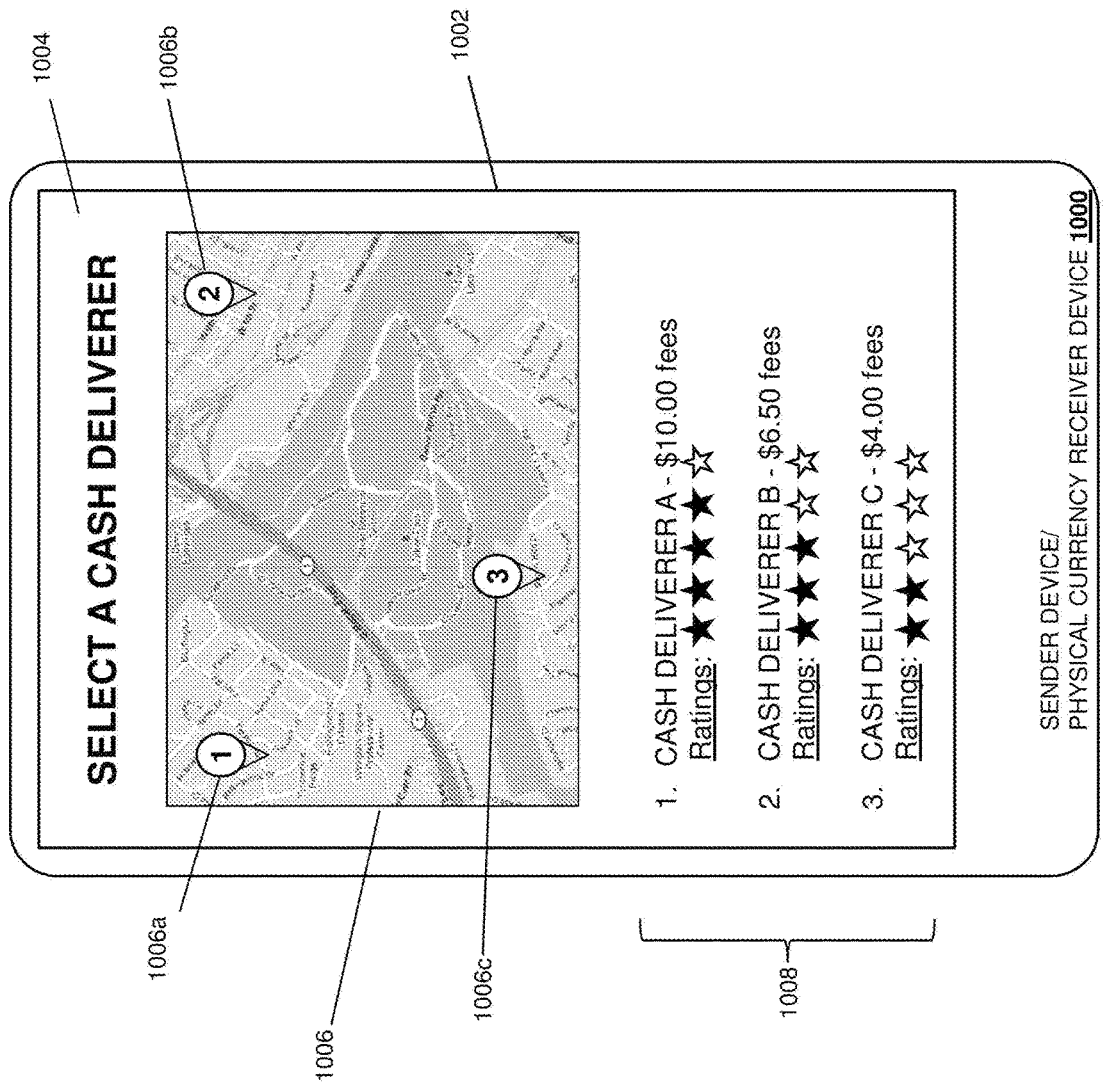
FIG. 10 is a screen shot illustrating an embodiment of a physical currency deliverer selection screen that may be provided on a sender device or physical currency receiver device.

Referring now to FIG. 10, an embodiment of a device 1000 that may be the sender device or the physical currency receiver device discussed above is illustrated. The device 1000 includes a display screen 1002 displaying an embodiment of a physical currency deliverer selection screen 1004 that may be provided to a sender or a physical currency receiver to select a physical currency deliverer. In the illustrated example, the physical currency deliverer selection screen 1004 includes a map 1006 that provides map details about the recipient location to which the physical currency is to be delivered, along with identifiers 1006a, 1006b, and 1006b for physical currency deliverers available at the recipient location, and a physical currency deliverer section 1008 that includes details about each of the physical currency deliverers associated with the respective identifiers 1006a-c on the map 1006.

In one example, in response to receiving bids from the physical currency deliverers, the system provider device 402 may provide the physical currency deliverer selection screen 1004 over the network for display on the device 1000 that includes physical currency deliverers, their associated fees, and in the illustrated embodiment, ratings that were previously collected by the system provider and that are based on other senders and/or physical currency receivers that previously used those physical currency deliverers to deliver currency to recipients. As such, in embodiments of block 104, the sender or the physical currency receiver may use the physical currency deliverer selection screen 1004 to select a physical currency deliverer for performing the method 100. In response to that selection, the system provider may identify the selected physical currency deliverer at block 104. However, in other embodiments, the system provider may select the physical currency deliverer for performing the method 100 from a database of physical currency deliverers based on, for example, the fees charged by that physical currency deliverer, the ratings for that physical currency deliverer, and/or any other information that would be apparent to one of skill in the art in possession of the present disclosure.

In some embodiments, following block 102 and/or block 104, the identity of the sender, the physical currency receiver, and/or the physical currency deliverer may be verified. In some examples, the sender may include an account with the system provider such as, for example, a payment account with a payment provider that operates as the system provider, and thus may be verified following block 102 using authentication credentials or other verification methods known in the art. Similarly, the physical currency receiver include an account with the system provider such as, for example, a payment account with a payment provider that operates as the system provider, and thus may be verified following block 102 using authentication credentials or other verification methods known in the art. Similarly, in some examples, the physical currency deliverer may include an account with the system provider such as, for example, a payment account with a payment provider that operates as the system provider, and thus may be verified following block 102 using authentication credentials or other verification methods known in the art.

In other embodiments, any of the sender, the physical currency receiver, and/or the physical currency deliverer may not have a payment account (or other account) with the system provider. In such situations, the identity of any of those parties may be verified using a virtual currency public ledger. For example, a co-inventor of the present disclosure created a virtual currency public ledger authentication system that is described in U.S. patent application Ser. No. 15/098,079, filed on Apr. 13, 2016, the disclosure of which is incorporated by reference in its entirety.

As described in that patent application, a virtual currency public ledger authentication system may include a registration method in which each of a user and a system provider perform a common hash operation on user identification information (e.g., a user name, a user address, a user phone number, a user date of birth, a user social security number, etc.) to generate respective first and second static user keys. The system provider then identifies a first registration public ledger address to the user, the user identifies a second registration public ledger address to the system provider, and the user then subsequently sends the first static user key to the first registration ledger address from the second registration public ledger address in a transaction in the virtual currency public ledger. The system provider then accesses that registration ledger address via the public ledger (using the identifications of the first and second registration ledger addresses to reference the public ledger) to retrieve the first static user key and register the user with the system if the first static user key matches the second static user key generated by the system provider. The first static user key in the public ledger then becomes a verified static user key in the public ledger that may be used for subsequent authentication of the user, and the system provider may erase or otherwise discard the user identification information and the second static user key.

Following registration, the user may authenticate with the system provider in an authentication method by sending the system provider a first previous authentication public ledger address that was used in a previous authentication attempt and a first current authentication public ledger address for use in the current authentication attempt. The system provider uses the first previous authentication public ledger address to access a database that identifies previous authentication public ledger addresses used by the user in previous authentication attempts and allows for the determination of a number of previous authentication attempts by the user, and identify the verified static user key in the public ledger. The system provider then performs a hash operation using the number of previous authentication attempts and the verified static user key to generate a first user authentication key. The system provider then provides the user a second current authentication public ledger address for use in the current authentication attempt. The user may also perform the hash operation using the number of previous authentication attempts and the verified static user key (both of which may be stored by the user in a transaction wallet) to generate a second user authentication key, and send the second user authentication key from the first current authentication public ledger address to the second current authentication public ledger address in a transaction on the public ledger. The system provider may then check the transaction sent from the first current authentication public ledger address to the second current authentication public ledger address in the public ledger to retrieve the second user authentication key and authenticate the user with the system if the second user authentication key matches the first user authentication key generated by the system provider.

Thus, senders, physical currency receivers, and/or physical currency deliverers may participate in the method 100 whether or not they have an account with the system provider. As such, physical currency receiver solicitations and/or physical currency deliverer solicitations may be responded to by both physical currency receivers and/or physical currency deliverers that have accounts with the system provider, as well as physical currency receivers and/or physical currency deliverers that do not have accounts with the system provider, as those with accounts may be verified via information associated with their respective accounts, and those without accounts may be verified via a virtual currency public ledger. One of skill in the art in possession of the present disclosure will recognize that the ability to verify physical currency receivers and/or physical currency deliverers in such a manner allows bids on physical currency receiver solicitations and/or physical currency deliverer solicitations from any of those parties to be accepted with the knowledge that those parties are verified entities. For example, a sender may select a physical currency receiver and a physical currency deliverer for use in transmitting physical currency to the recipient with the knowledge that they have been verified by the system provider. Similarly, a physical currency receiver may select a physical currency deliverer for use in transmitting physical currency to the recipient with the knowledge that the physical currency deliverer has been verified by the system provider, and a physical currency deliverer may accept a physical currency deliverer solicitation with the knowledge that the physical currency receiver or the sender have been verified by the system provider.

The method 100 then proceeds to block 106 where a physical currency delivery confirmation code is generated and associated with a recipient. In an embodiment, the system provider device(s) 402 may operate at block 106 to generate a physical currency delivery confirmation code and associate that physical currency delivery confirmation code with the recipient 412. For example, at block 106, the system provider device(s) 402 may generate a numerical code, an alphanumeric code, a word or phrase, and/or any codes having any other code characteristics known in the art. In a specific example, the system provider device(s) 402 may send a request over the network 404 to the physical currency receiver device 406 or the sender device from which the physical currency transfer request was received, and the physical currency receiver or the sender, respectively, may transmit a request to the system provider device to generate and associate a desired physical currency delivery confirmation code with the recipient 412 at block 106. As such, in some embodiments the sender 408 may suggest the details of the physical currency delivery confirmation code to the system provider device 402 (e.g., via their sender device) so that the system provider may generate the physical currency delivery confirmation code, while in the some embodiments the physical currency receiver may solicit the sender 408 for the details of the physical currency delivery confirmation code, and provide those details to the system provider device 402 (e.g., via their physical currency receiver device 406) so that the system provider may generate the physical currency delivery confirmation code, or may simply suggest the details for the physical currency delivery confirmation code (i.e., without soliciting the sender 408 for those details) to the system provider device 402 (e.g., via their physical currency receiver device 406) so that the system provider may generate the physical currency delivery confirmation code. While a few examples have been provided, one of skill in the art in possession of the present disclosure will recognize that a variety of code generation techniques may be utilized to generate the so that the system provider may generate the physical currency delivery confirmation code that is associated with the recipient 412 at block 106.

At block 106, the physical currency delivery confirmation code 'that is generated and associated with the recipient 412 is also provided to the recipient 412. In one example, the system provider device(s) 402 may transmit the physical currency delivery confirmation code to the recipient 412 via recipient contact information (e.g., an email address, a phone number (e.g., a call or text), a social media identifier, a physical address, etc.) that may be provided by the sender or the physical currency transfer receiver using, for example, the physical currency transfer request screen 804. In another example, the sender or the physical currency receiver may transmit the physical currency delivery confirmation code (the details of which may have been determined by the sender or the physical currency receiver) to the recipient 412 via recipient contact information (e.g., an email address, a phone number (e.g., a call or text), a social media identifier, a physical address, etc.) which may be known to the sender, or provided by the sender to the physical currency transfer receiver using, for example, the physical currency transfer request screen 804. While a few examples have been provided, one of skill in the art in possession of the present disclosure will recognize that the physical currency delivery confirmation code generated at block 106 may be provided to the recipient 412 using a variety of techniques.

The method 100 then proceeds to block 108 where a virtual currency address that is controlled by the physical currency deliverer is identified to the sender or physical currency receiver. In an embodiment, the system provider device(s) 402 may operate at block 108 to identify, to the physical currency receiver, a virtual currency address that is controlled by the physical currency deliverer. For example, at block 108 the system provider device(s) 402 may send a virtual currency address request through the network to the physical currency deliverer device 410 of the physical currency deliverer that accepted the physical currency deliverer solicitation, and the physical currency deliverer may respond to the virtual currency address request using the physical currency deliverer device 410 to send a virtual currency address that is controlled by the physical currency deliverer (e.g., that is generated by an electronic wallet provided in the physical currency deliverer device and that includes private key(s) that are configured to transfer electronic coins from that virtual currency address to another virtual currency address) through the network to the system provider device(s) 402. In response to receiving that virtual currency address, the system provider device(s) 402 may identify that virtual currency address to the physical currency receiver device 406 or the sender device via an email, a text message, a phone call, a web page, an application page, and/or any other virtual currency address notification technique that would be apparent to one of skill in the art in possession of the present disclosure.

In another example, at block 108 the physical currency receiver device 406 or the sender device may send the virtual currency address request through the network to the physical currency deliverer device 410 of the physical currency deliverer that accepted the physical currency deliverer solicitation, and the physical currency deliverer may respond to the virtual currency address request by using the physical currency deliverer device 410 to send a virtual currency address that is controlled by the physical currency deliverer (e.g., that is generated by an electronic wallet of the physical currency deliverer that includes private key(s) that are configured to transfer electronic coins from that virtual currency address to another virtual currency address) through the network to the physical currency receiver device 406 or the sender device. While a few examples have been provided, one of skill in the art in possession of the present disclosure will recognize that the virtual currency address may be identified to the physical currency receiver or sender in a variety of manners while remaining within the scope of the present disclosure. For example, rather than providing the virtual currency address in response to a virtual currency address solicitation, the physical currency deliverer may provide the virtual currency address as part of the "bid" that is provided in response to the physical currency deliverer solicitation.

In some embodiments, subsequent to identifying the virtual currency address to the physical currency receiver, the system provider device(s) 402 may receive information for signing a multi-signature transaction through the network 404 from the physical currency receiver device 406 or the sender device. For example, upon receiving the virtual currency address at block 108, the sender or the physical currency receiver may use their sender device or physical currency receiver device 406 to create a multi-signature transaction that is configured to transfer virtual currency to the physical currency deliverer and that includes the system provider as a signing party, and sign and send a virtual currency transaction that is part of that multi-signature transaction.

One of skill in the art in possession of the present disclosure will recognize that the sender or the physical currency receiver may create the multi-signature transaction that identifies an amount of funds to transfer (which may be equal to the amount of physical currency being delivered and the fee specified by the physical currency deliverer for delivering the physical currency), identifies the physical currency deliverer as the destination of the funds, and includes the sender/physical currency receiver and the system provider as signing parties. For example, the multi-signature transaction created at block 108 may require signatures using both of a private key available to the sender or the physical currency receiver and a private key available to the system provider in order for that virtual currency transaction to transfer the identified funds from the sender or the physical currency receiver to the physical currency deliverer. As such, the sender device or physical currency receiver device 406 may gather (or generate) public ledger addresses, obtain public keys from the sender device or physical currency receiver device 406 and the system provider device(s) 402, and create a multi-signature transaction address for the multi-signature transaction. At block 108, the sender or physical currency receiver device may then create a virtual currency transaction that identifies the multi-signature transaction address as a destination of funds, and sign that transaction using a private key. As such, at block 108, the sender device or physical currency receiver device 406 provides information for signing the multi-signature transaction over the network 404 to the system provider device(s) 402.

In other embodiments, the system provider may generate a multi-signature transaction and send information for signing the multi-signature transaction through the network to the sender or the physical currency receiver. For example, the identification of the virtual currency address to the sender or the physical currency receiver at block 108 may be via a multi-signature transaction that is sent by the system provider to the sender or the physical currency receiver and that is configured to send virtual currency to that virtual currency address, as the system provider may use their system provider device 402 to create a multi-signature transaction similarly as described above, with the multi-signature transaction configured to transfer virtual currency to the physical currency deliverer and including the sender or physical currency receiver as a signing party. In response to receiving the information for signing the multi-signature transaction, the sender or the physical currency receiver may then sign the multi-signature transaction as discussed above.

In either of the embodiments discussed above (i.e., in which the sender or physical currency receiver creates and signs the multi-signature transaction and sends information for signing that multi-signature transaction to the system provider; or in which the system provider creates the multi-signature transaction, sends information for signing that multi-signature transaction to the sender or physical currency receiver, and the sender or physical currency receiver signs that multi-signature transaction), the system provider may then determine that the sender or physical currency receiver has signed the multi-signature transaction and, in response, confirm that the physical currency amount should be delivered to the recipient 412. For example, at block 108 the system provider may confirm that the sender or the physical currency receiver has signed the multi-signature transaction and, in response, use the system provider device(s) 402 to send a physical currency delivery confirmation through the network 404 to the sender device or the physical currency deliverer device 410. In addition, the system provider device(s) 402 may confirm the amount of physical currency, and the amount of virtual currency that will be transferred in the multi-signature transaction as well. In response to receiving the physical currency delivery confirmation from the system provider, the physical currency deliverer may then deliver the amount of physical currency to the recipient with the knowledge that the sender or physical currency receiver has committed to a virtual currency transaction (i.e., by signing the multi-signature transaction) that will reimburse the physical currency deliverer.

The method 100 then proceeds to block 110 where a reimbursement request code is received from the physical currency deliverer, and verified using the physical currency delivery confirmation code. In an embodiment, the system provider device(s) 402 operates at block 110 to receive a reimbursement request code through the network from the physical currency deliverer device 410, and verify that reimbursement request code using the physical currency delivery confirmation code that was generated and associated with the recipient 412 at block 106. For example, following receiving of the physical currency delivery confirmation, the physical currency deliverer may go to the recipient location, request and receive a code from the recipient 412, and use the physical currency deliverer device 410 to send a reimbursement request code (which is the code received from the recipient 412) over the network to the system provider device(s) 402.

Figure 11:
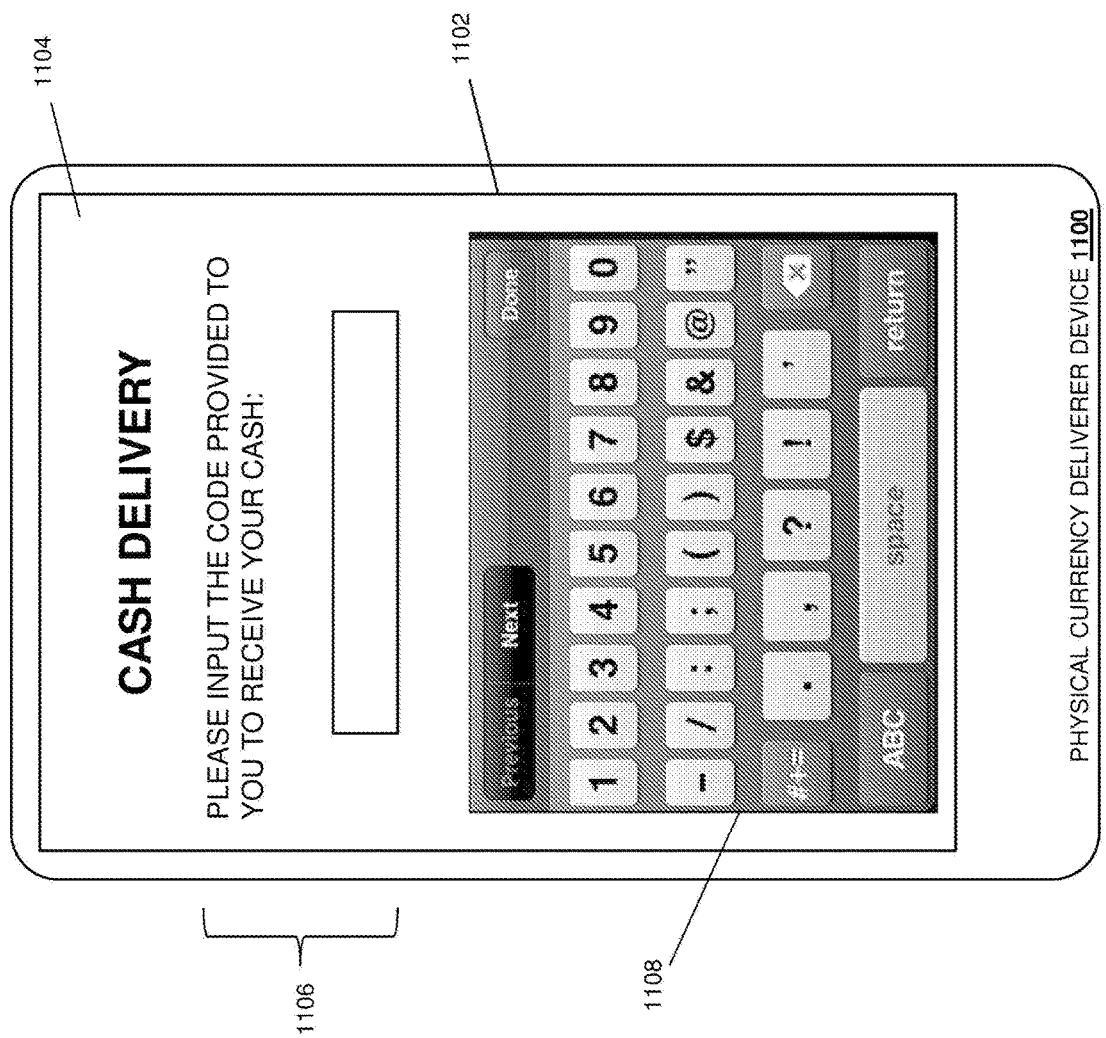
FIG. 11 is a screen shot illustrating an embodiment of a physical currency code delivery verification screen that may be provided on a physical currency deliverer device.

Referring now to FIG. 11, an embodiment of a physical currency deliverer device 1100 is illustrated. The physical currency deliverer device 1100 includes a display screen 1102 displaying an embodiment of a physical currency code delivery verification screen 1104 that may be provided for display to receive a code from the recipient 412. In the illustrated example, the physical currency code delivery verification screen 1104 includes a code input section 1106 that instructs the recipient 412 to input the code provided to them by the system provider, the sender, or the physical currency receiver in order to receive the amount of physical currency sent by the sender. The physical currency code delivery verification screen 1104 also includes an input section 1108 that provides a virtual input device that may be utilized by the recipient 412 to input the code into the code input section 1106. One of skill in the art in possession of the present disclosure will recognize that the physical currency deliverer may also receive the code (e.g., audibly) from the recipient 412 and use the physical currency code delivery verification screen 1104 to input the code into the code input section 1106 as well. Upon inputting the code into the code input section 1106, at block 110 the physical currency deliverer device 410/1100 sends that code as a reimbursement request code over the network to the system provider device(s) 402. In an embodiment, the reimbursement request code may identify the recipient 412 as well.

In response to receiving the reimbursement request code through the network 404 from the physical currency receiver device 410, the system provider device(s) 402 operates at block 110 to verify the reimbursement code using the physical currency delivery confirmation code generated at block 106. For example, at block 110, the system provider device(s) 402 may compare the reimbursement request code received from the physical currency receiver to the physical currency delivery confirmation code that was associated with the recipient 412 and, in response to the reimbursement request code matching the physical currency delivery confirmation code, may verify the reimbursement request code and send a code confirmation notification over the network 404 to the physical currency receiver device 410. In response to receiving the code confirmation notification, the physical currency receiver may then provide the amount of physical currency identified in the physical currency transfer request to the recipient 412. As such, the physical currency deliverer may provide the physical currency to the recipient 412 in response to the recipient 412 providing the code that was generated by the system provider and associated with recipient 412 at block 106, thus assuring the physical currency deliverer that that recipient is the correct recipient for receiving the physical currency.

The method 100 then proceeds to block 112 where a multi-signature transaction that was previously signed by the sender/physical currency receiver is signed to cause a virtual currency amount to be transferred to the virtual currency address controlled by the physical currency deliverer. In an embodiment, the system provider device(s) 402 operates at block 112 to sign the multi-signature transaction discussed above to cause a virtual currency amount to be transferred to the virtual currency address that is controlled by the physical currency deliverer. For example, in response to verifying the reimbursement request code using the the physical currency delivery confirmation code at block 110, the system provider may use the system provider device(s) 402 to sign the multi-signature transaction that, as discussed above, may have been generated by the system provider or the sender/physical currency receiver. As would be understood by one of skill in the art in possession of the present disclosure, the signing of the multi-signature transaction (which was previously signed by the sender or physical currency deliverer) by the system provider will cause that multi-signature transaction to be broadcast to the public ledger devices 414, confirmed by the public ledger devices 414, and added to the public ledger 418 such that the virtual currency amount specified in the multi-signature transaction is transferred to the virtual currency address controlled by the physical currency deliverer. As such, in some embodiments, as soon as the code received from the recipient by the physical currency deliverer is transmitted to the system provider and verified, the multi-signature transaction is signed so that the physical currency deliverer is immediately reimbursed for the amount of physical currency provided to the recipient, along with a fee for the physical currency delivery, using a virtual currency, Thus, systems and methods have been described that provide for virtual currency secured physical currency transmissions by receiving a physical currency transfer request and, in response, identifying a physical currency receiver and a physical currency deliverer that may be verified/authenticated using a virtual currency public ledger. A physical currency delivery confirmation code is then associated with a recipient identified in the physical currency recipient information, and a virtual currency address that is controlled by the physical currency deliverer is identified to a sender or physical currency receiver. When a reimbursement request code is received from the physical currency deliverer, it is verified using the physical currency delivery confirmation code and, in response to the verification, a multi-signature transaction that has been previously signed by the sender or physical currency receiver is signed to cause a virtual currency amount to be transferred via the virtual currency public ledger to the virtual currency address that is controlled by the physical currency deliverer. As such, a virtual currency public ledger may be used to verify parties participating in the physical currency transmission system, and reimbursements for physical currency delivered to a recipient may be made via a multi-signature transaction that transfers virtual currency to the physical currency deliverer only when a physical currency delivery confirmation code is provided by the recipient in response to receiving the physical currency, thus securing the physical currency transmission using the virtual currency.

While the embodiments above discuss the delivery of a physical currency to the recipient during the method 100, in some embodiments, other instruments of value may be delivered to the recipient while remaining within the scope of the present disclosure. For example, instead of delivering a physical currency, the physical currency deliverer may instead generate, procure, purchase, and/or otherwise obtain a prepaid debit card that includes the amount of the physical currency provided by the sender, and may deliver that prepaid debit card to the recipient. As is known in the art, the recipient may then set up security features of the prepaid debit card such as a Personal Identification Number (PIN) and/or other authentication code so that the prepaid debit card may be used to make purchases. While a prepaid debit card has been provided as an example, one of skill in the art in possession of the present disclosure will recognize how a variety of other instruments of value may be utilized while remaining within the scope of the present disclosure as well.

Figure 12:
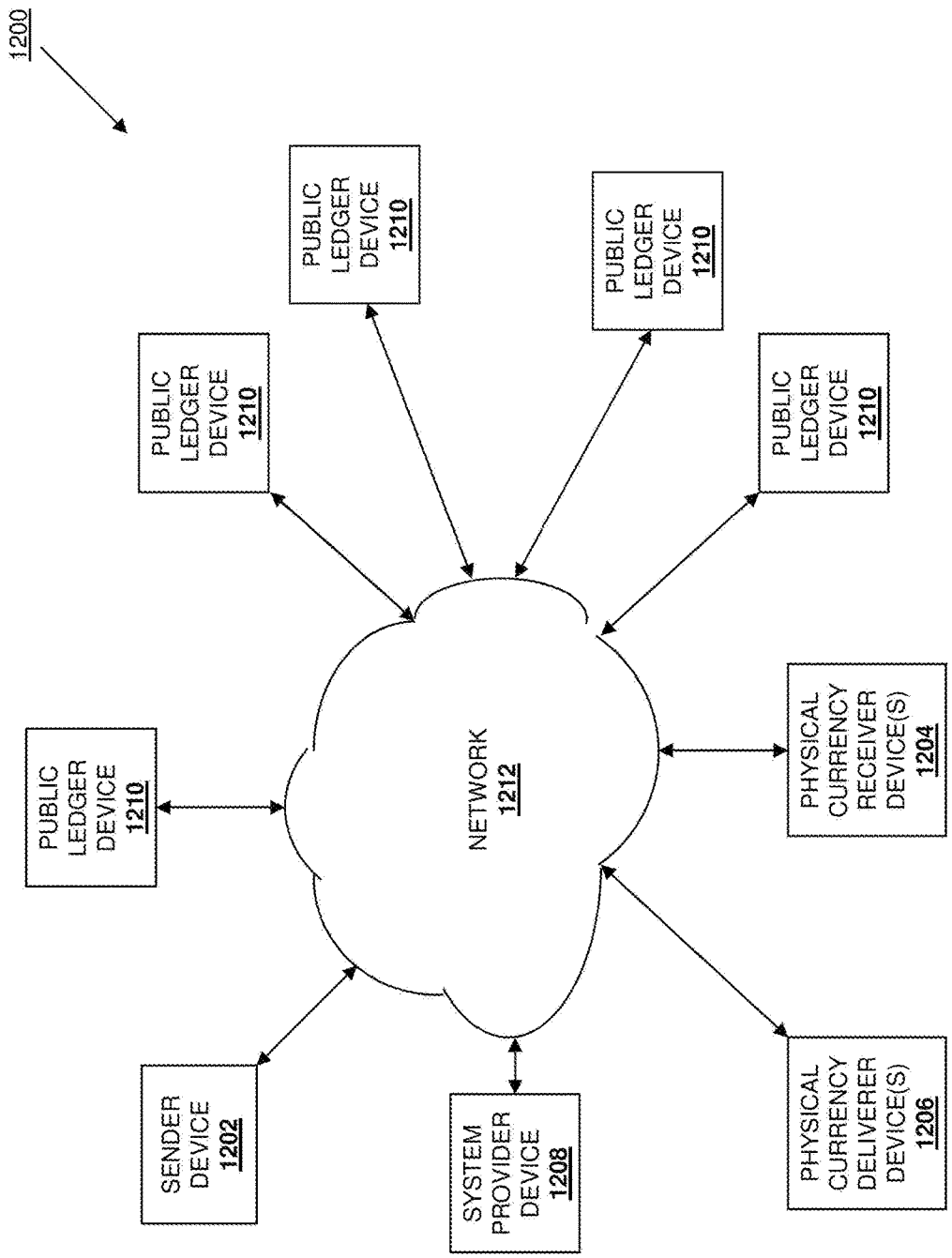
FIG. 12 is a schematic view illustrating an embodiment of a networked system.

Referring now to FIG. 12, an embodiment of a networked system 1200 used in the physical currency transmission system 400 described above is illustrated. The networked system 1200 may include a sender device 1202, one or more physical currency receiver device(s) 1204, one or more physical currency deliverer device(s) 1206, a system provider device 1208, and/or a plurality of public ledger devices 1210 in communication over a network 1212. The sender device 1202 may be the sender devices operated by the senders discussed above. Any of the physical currency receiver devices 1204 may be the physical currency receiver devices discussed above. Any of the physical currency deliverer devices 1206 may be the physical currency deliverer devices discussed above. Any of the system provider devices 1208 may be the system provider devices operated by the system providers, discussed above. Any of the public ledger devices 1210 may be the public ledger devices discussed above.

The sender device 1202, physical currency receiver devices 1204, physical currency deliverer devices 1206, system provider devices 1208, and/or public ledger devices 1210 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 1200, and/or accessible over the network 1212.

The network 1212 may be implemented as a single network or a combination of multiple networks. For example, in various embodiments, the network 1212 may include the Internet and/or one or more intranets, landline networks, wireless networks, and/or other appropriate types of networks.

The sender device 1202, physical currency receiver devices 1204, and/or physical currency deliverer devices 1206 may be implemented using any appropriate combination of hardware and/or software configured for wired and/or wireless communication over network 1212. For example, in one embodiment, the sender device 1202, physical currency receiver devices 1204, and/or physical currency deliverer devices 1206 may be implemented as personal computers in communication with the Internet. In other embodiments, the sender device 1202, physical currency receiver devices 1204, and/or physical currency deliverer devices 1206 may be a smart phone, wearable computing device, laptop computer, and/or other types of computing devices.

The sender device 1202, physical currency receiver devices 1204, and/or physical currency deliverer devices 1206 may include one or more browser applications which may be used, for example, to provide a convenient interface to permit the payer to browse information available over the network 1212. For example, in one embodiment, the browser application may be implemented as a web browser configured to view information available over the Internet.

The sender device 1202, physical currency receiver devices 1204, and/or physical currency deliverer devices 1206 may also include one or more toolbar applications which may be used, for example, to provide user-side processing for performing desired tasks in response to operations selected by the user. In one embodiment, the toolbar application may display a user interface in connection with the browser application.

The sender device 1202, physical currency receiver devices 1204, and/or physical currency deliverer devices 1206 may further include other applications as may be desired in particular embodiments to provide desired features to the user devices 702. In particular, the other applications may include a physical currency transmission application for transmitting physical currency assisted by a payment service provider. The other applications may also include security applications for implementing user-side security features, programmatic user applications for interfacing with appropriate application programming interfaces (APIs) over the network 1212, or other types of applications. Email and/or text applications may also be included, which allow the user to send and receive emails and/or text messages through the network 1212. The sender device 1202, physical currency receiver devices 1204, and/or physical currency deliverer devices 1206 include one or more user and/or device identifiers which may be implemented, for example, as operating system registry entries, cookies associated with the browser application, identifiers associated with hardware of the sender device 1202, physical currency receiver devices 1204, and/or physical currency deliverer devices 1206, or other appropriate identifiers, such as a phone number. In one embodiment, the user identifier may be used to associate the user with a particular account as further described herein.

Figure 13:
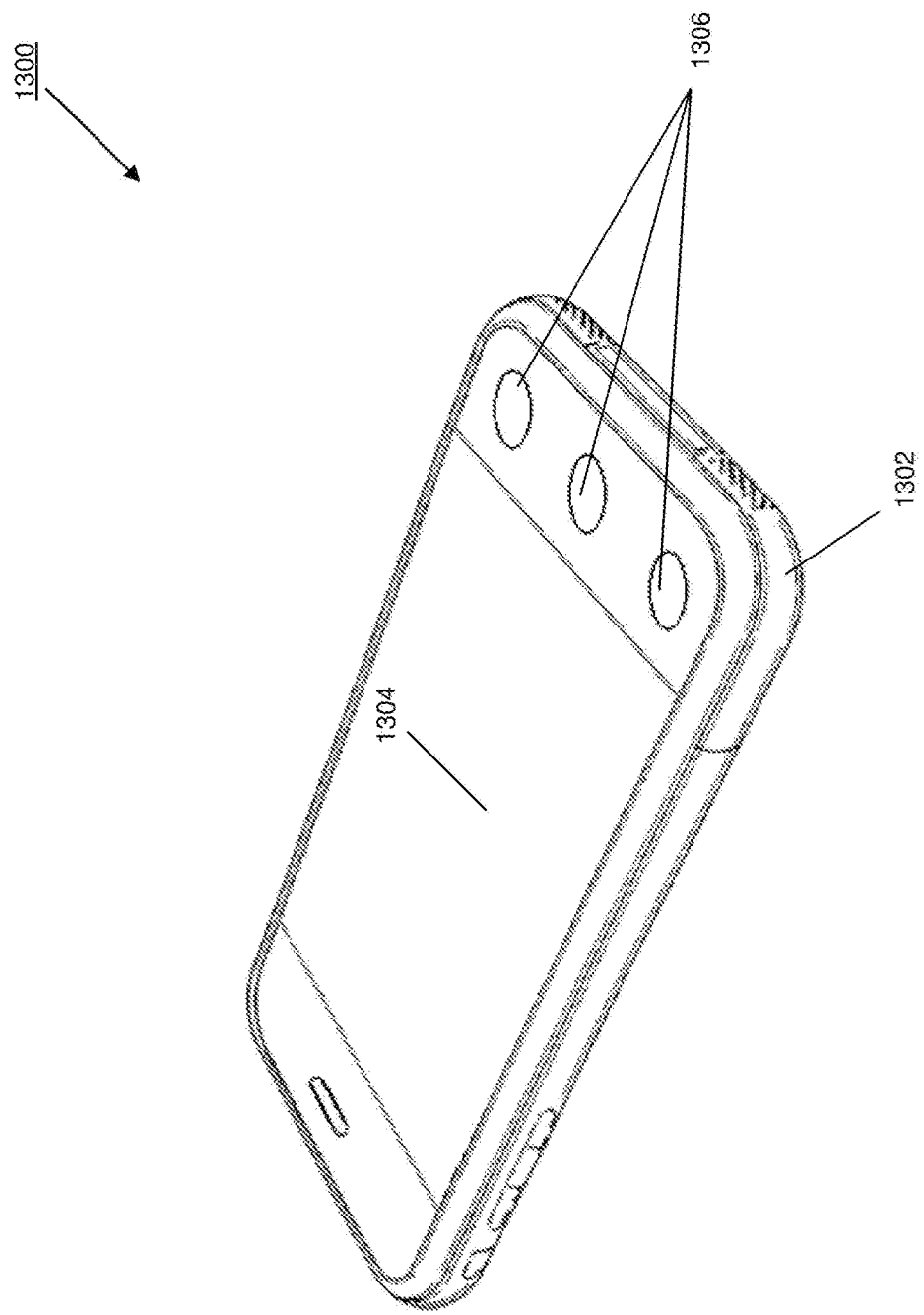
FIG. 13 is a perspective view illustrating an embodiment of a device.

Referring now to FIG. 13, an embodiment of a device 1300 is illustrated. The device 1300 may be any of the sender device 1202, physical currency receiver devices 1204, and/or physical currency deliverer devices 1206 discussed above. The device 1300 includes a chassis 1302 having a display 1304 and an input device including the display 1304 and a plurality of input buttons 1306. One of skill in the art will recognize that the device 1300 is a portable or mobile phone including a touch screen input device and a plurality of input buttons that allow the functionality discussed above with reference to the method 100. However, a variety of other portable/mobile devices and/or desktop devices may be used in the method 100 without departing from the scope of the present disclosure.

Figure 14:
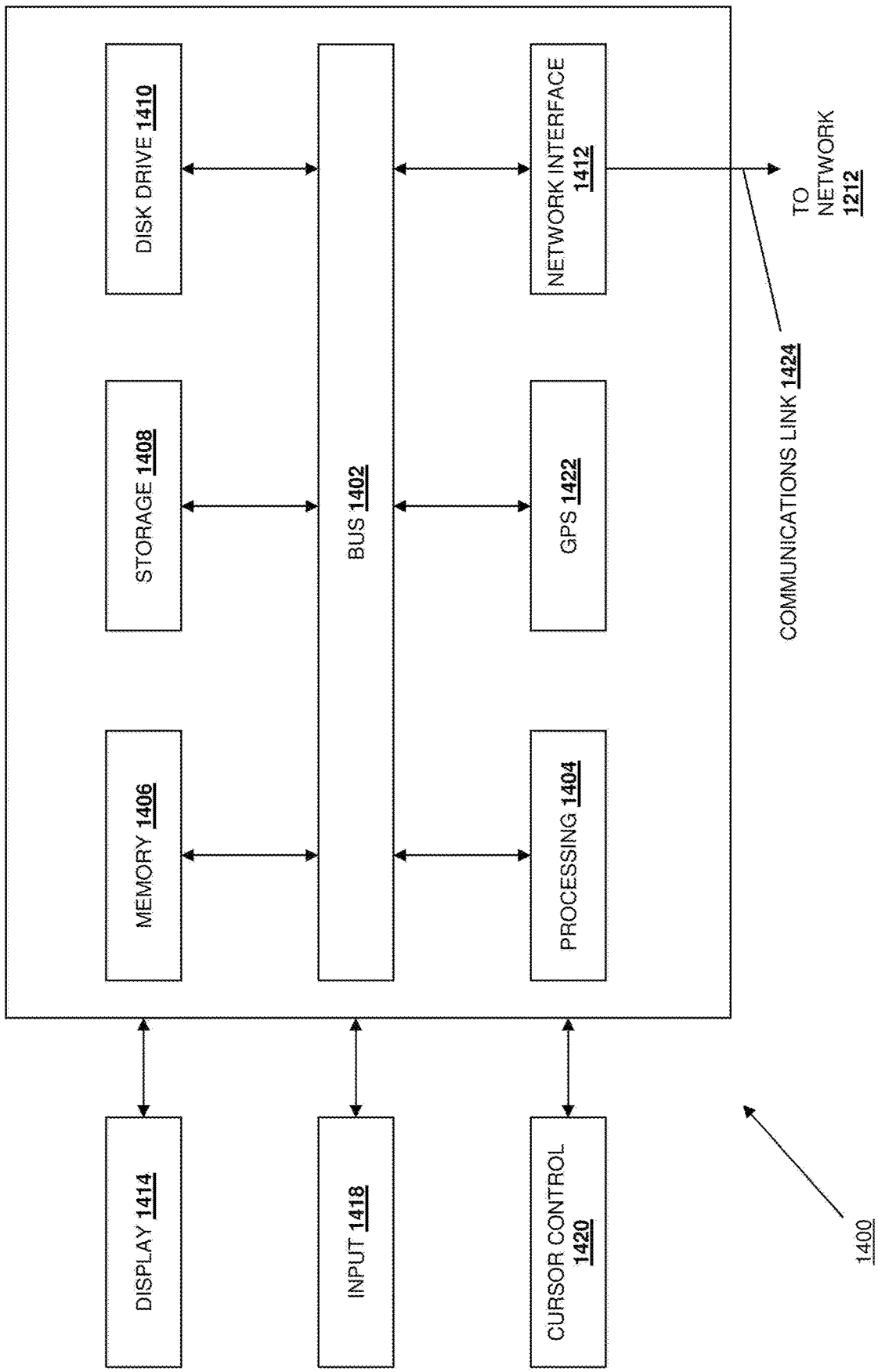
FIG. 14 is a schematic view illustrating an embodiment of a computer system.

Referring now to FIG. 14, an embodiment of a computer system 1400 suitable for implementing, for example, the user devices, public ledger devices, and/or system provider devices, is illustrated. It should be appreciated that other devices utilized in the public ledger authentication system discussed above may be implemented as the computer system 1400 in a manner as follows.

In accordance with various embodiments of the present disclosure, computer system 1400, such as a computer and/or a network server, includes a bus 1402 or other communication mechanism for communicating information, which interconnects subsystems and components, such as a processing component 1404 (e.g., processor, micro-controller, digital signal processor (DSP), etc.), a system memory component 1406 (e.g., RAM), a static storage component 1408 (e.g., ROM), a disk drive component 1410 (e.g., magnetic or optical), a network interface component 1412 (e.g., modem or Ethernet card), a display component 1414 (e.g., CRT or LCD), an input component 1418 (e.g., keyboard, keypad, or virtual keyboard), a cursor control component 1420 (e.g., mouse, pointer, or trackball), and/or a location determination component 1422 (e.g., a Global Positioning System (GPS) device as illustrated, a cell tower triangulation device, and/or a variety of other location determination devices known in the art). In one implementation, the disk drive component 1410 may comprise a database having one or more disk drive components.

In accordance with embodiments of the present disclosure, the computer system 1400 performs specific operations by the processor 1404 executing one or more sequences of instructions contained in the memory component 1406, such as described herein with respect to the payer devices, payee devices, user devices, payment service provider devices, and/or system provider devices. Such instructions may be read into the system memory component 1406 from another computer readable medium, such as the static storage component 1408 or the disk drive component 1410. In other embodiments, hard-wired circuitry may be used in place of or in combination with software instructions to implement the present disclosure.

Logic may be encoded in a computer readable medium, which may refer to any medium that participates in providing instructions to the processor 1404 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1410, volatile media includes dynamic memory, such as the system memory component 1406, and transmission media includes coaxial cables, copper wire, and fiber optics, including wires that comprise the bus 1402. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1400. In various other embodiments of the present disclosure, a plurality of the computer systems 1400 coupled by a communication link 1424 to the network 1212 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1400 may transmit and receive messages, data, information and instructions, including one or more programs (i.e., application code) through the communication link 1424 and the network interface component 1412. The network interface component 1412 may include an antenna, either separate or integrated, to enable transmission and reception via the communication link 1424. Received program code may be executed by processor 1404 as received and/or stored in disk drive component 1410 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method for transmitting physical currency, comprising:
    accessing, by a provider device, a physical currency transfer request that indicates a physical currency amount and a recipient, the provider device configured to perform a transfer of the physical currency amount via cryptocurrency the recipient;
    identifying, by the provider device, a delivery device associated with a certain physical currency deliverer that is a different device than a receiver device of the recipient;
    identifying, by the provider device, a cryptocurrency address, that is controlled by the physical currency deliverer, associated with a cryptocurrency public ledger;
    signing, by the provider device and using a provider private key that is stored in the provider device, a multi-signature transaction associated with a receiver private key that is stored at the receiver device, the multi-signature transaction indicating with the physical currency amount or a cryptocurrency amount for the physical currency amount; and
    broadcasting, by the provider device, the multi-signature transaction signed using the provider private key and the receiver private key to cause a cryptocurrency amount to be transferred via the cryptocurrency public ledger to the cryptocurrency address.

2. The method of claim 1, further comprising:
    associating a delivery confirmation code with the recipient that is identified by the physical currency transfer request;
    receiving, by the provider device through a communications network from the delivery device, a reimbursement request code; and
    verifying, by the provider device, the reimbursement request code using the delivery confirmation code.

3. The method of claim 1, further comprising:
    identifying, by the provider device through a communications network to the delivery device, the physical currency amount and a recipient location that is indicated by the physical currency transfer request.

4. The method of claim 1, further comprising:
    receiving, by the provider device through a communication network from the receiver device, information for signing the multi-signature transaction.

5. The method of claim 1, further comprising:
    responsive to accessing the physical currency transfer request, generating, by the provider device, the multi-signature transaction;
    communicating, by the provider device through a communications network to the receiver device, information for signing the multi-signature transaction; and
    responsive to determining that the physical currency deliverer has signed the multi-signature transaction using the receiver private key, confirming, by the provider device, that the physical currency amount should be delivered to the recipient.

6. The method of claim 1, further comprising:
    publishing, by the provider device through a communications network to a physical currency delivery network, a physical currency delivery solicitation; and
    receiving, by the provider device through the communications network from the delivery device, an acceptance of the physical currency delivery solicitation that is associated with the delivery device.

7. The method of claim 6, wherein the receiving the acceptance of the physical currency delivery solicitation further comprises:
    receiving, by the provider device through the communications network, a plurality of bids associated with the physical currency delivery solicitation; and
    accepting, by the provider device, a first bid of the plurality of bids that was received from the delivery device.

8. The method of claim 1, wherein the provider device is configured to perform a transfer the cryptocurrency amount of cryptocurrency between a first virtual account of the recipient and a second virtual account of a transferrer.

9. A device, comprising:
    a non-transitory memory storing instructions; and
    a processor configured to execute the instructions to cause the device to:
        receive, through a communication network, a transfer request that indicates an intent to transfer a physical currency amount from a sender to a recipient, the device configured to perform a transfer of the physical currency amount via cryptocurrency the recipient;

identify a delivery device associated with a deliverer, the delivery device being a different device than a receiver device of the recipient or a sender device of the sender;

identify a cryptocurrency address, for use by the delivery device for transfer of a cryptocurrency amount to another cryptocurrency address, at a cryptocurrency public ledger;

sign, using a provider private key that is stored at the device, a multi-signature transaction associated with a private key that is stored at the receiver device, the multi-signature transaction indicating with the physical currency amount or a cryptocurrency amount for the physical currency amount; and broadcast the multi-signature transaction signed using the provider private key and the private key to cause a cryptocurrency amount to be transferred via the cryptocurrency public ledger to the cryptocurrency address.

10. The device of claim 9, wherein executing the instructions further causes the device to, associate a delivery confirmation code with the recipient that is identified by the transfer request;

receive, through the communications network from the delivery device, a reimbursement request code; and verify the reimbursement request code using the delivery confirmation code.

11. The device of claim 9, wherein executing the instructions further causes the device to, identify, through the communications network to the delivery device, the physical currency amount and a recipient location that is indicated by the transfer request.

12. The device of claim 9, wherein executing the instructions further causes the device to, receive, through the communication network from the receiver device, information for signing the multi-signature transaction.

13. The device of claim 9, wherein executing the instructions further causes the device to, responsive to receiving the transfer request, generate the multi-signature transaction;

communicate, through the communications network to the receiver device, information for signing the multi-signature transaction; and responsive to determining that the deliverer has signed the multi-signature transaction using the private key, confirm that the physical currency amount should be delivered to the recipient.

14. The device of claim 9, wherein executing the instructions further causes the device to, publish, through the communications network to a deliverer network, a physical currency delivery solicitation; and receive, through the communications network from the delivery device, an acceptance of the physical currency delivery solicitation that is associated with the delivery device.

15. A non-transitory machine-readable medium having instructions stored thereon, the instructions executable to cause performance of operations comprising:

receiving, through a communication network and at a device, a transfer request that indicates an intent to transfer a physical currency amount from a sender to a recipient, the device configured to perform a transfer of the physical currency amount via cryptocurrency the recipient;

identifying a delivery device associated with a deliverer, the delivery device being a different device than a receiver device of the recipient or a sender device of the sender;

identifying a cryptocurrency address, for use by the delivery device for transfer of a cryptocurrency amount to another cryptocurrency address, at a cryptocurrency public ledger;

signing, using a first key that is stored at the device, a multi-signature transaction associated with a second key that is stored at the receiver device, the multi-signature transaction indicating with the physical currency amount or a cryptocurrency amount for the physical currency amount; and broadcasting the multi-signature transaction signed using the first key and the second key to cause a cryptocurrency amount to be transferred via the cryptocurrency public ledger to the cryptocurrency address.

16. The non-transitory machine-readable medium of claim 15, wherein the operations further comprise:

associating a delivery confirmation code with the recipient that is identified by the transfer request;

receiving, through the communications network from the delivery device, a reimbursement request code; and verifying the reimbursement request code using the delivery confirmation code.

17. The non-transitory machine-readable medium of claim 15, wherein the operations further comprise:

identifying, through the communications network to the delivery device, the physical currency amount and a recipient location that is indicated by the transfer request.

18. The non-transitory machine-readable medium of claim 15, wherein the operations further comprise:

responsive to receiving the transfer request, generating the multi-signature transaction;

communicating, through the communications network to the receiver device, information for signing the multi-signature transaction; and responsive to determining that the deliverer has signed the multi-signature transaction using the second key, confirming that the physical currency amount should be delivered to the recipient.

19. The non-transitory machine-readable medium of claim 15, wherein the operations further comprise:

publishing, through the communications network to a deliverer network, a physical currency delivery solicitation; and receiving, through the communications network from the delivery device, an acceptance of the physical currency delivery solicitation that is associated with the delivery device.

20. The non-transitory machine-readable medium of claim 19, wherein the operations further comprise:

receiving, through the communications network, a plurality of bids associated with the physical currency delivery solicitation; and accepting a first bid of the plurality of bids that was received from the delivery device.

* * * * *